United States Patent
Sasaki

(12) 
(10) Patent No.: US 6,278,580 B1
(45) Date of Patent: Aug. 21, 2001

(54) COMPOSITE TYPE THIN FILM MAGNETIC HEAD THAT INCLUDES A POLE CHIP AND A TOP POLE AND AN INSULATING LAYER THAT ACTS AS AN ETCHING STOPPER DURING ANISOTROPIC ETCHING

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/416,891

(22) Filed: Oct. 13, 1999

(30) Foreign Application Priority Data

Oct. 15, 1998 (JP) .................................................. 10-293195

(51) Int. Cl.[7] ................................. G11B 5/23; G11B 5/39
(52) U.S. Cl. ........................... 360/126; 360/120; 360/317
(58) Field of Search ..................................... 360/317, 122, 360/126, 120

(56) References Cited

U.S. PATENT DOCUMENTS 6,204,997 * 3/2001 Sasaki ................................ 360/123

FOREIGN PATENT DOCUMENTS 10-55516   2/1998  (JP) .

* cited by examiner

*Primary Examiner*—Jefferson Evans
(74) *Attorney, Agent, or Firm*—Oliff & Berridge PLC

(57) ABSTRACT

On the bottom pole is formed a write gap layer, on which a pole chip and an insulating layer are formed so as to have flat surfaces and a thin film coil is formed on the insulating layer. A top pole is formed so as to cover the pole chip and thereafter, a photoresist as a mask is formed in a given pattern. Then, the forefront of the top pole is receded from the air bearing surface by anisotropic etching with the insulating layer to embed the surroundings of the pole chip as an etching stopper. The anisotropic etching recedes the forefront of the top pole precisely without influencing the size and shape of the pole chip. The slope of the forefront can prevent an overcoat layer from peeling off when polishing the air bearing surface. The backward extending of the pole chip beyond a position of throat height=0 and the widening of the backward part can broaden the contacting area between the pole chip and the top pole and inhibit the magnetic saturation although the forefront of the pole chip is receded from the air bearing surface.

15 Claims, 23 Drawing Sheets

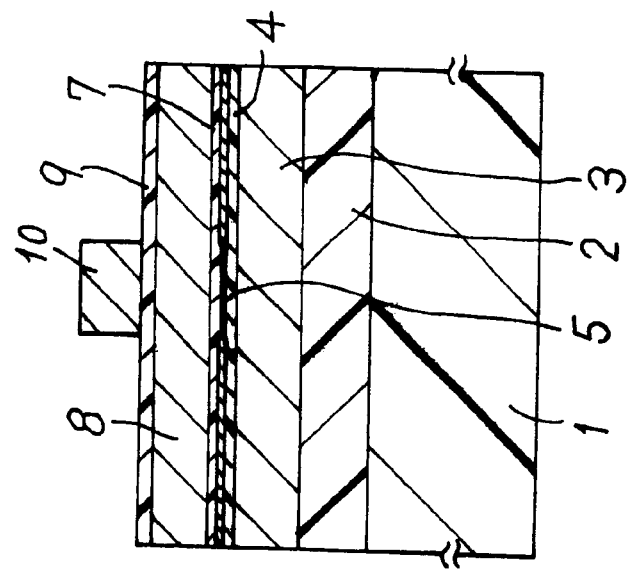
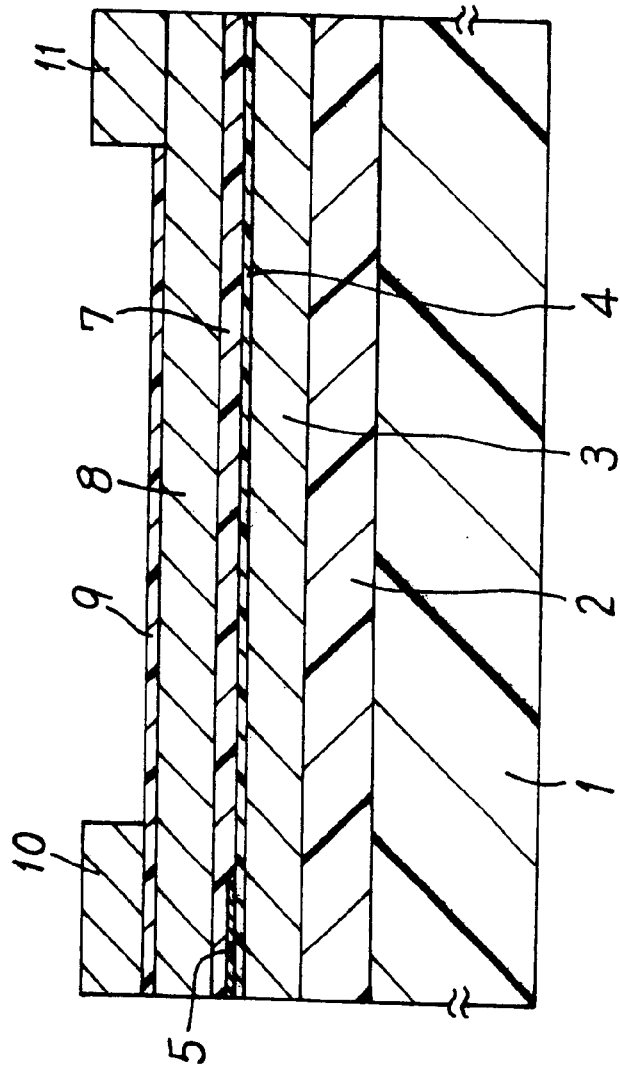

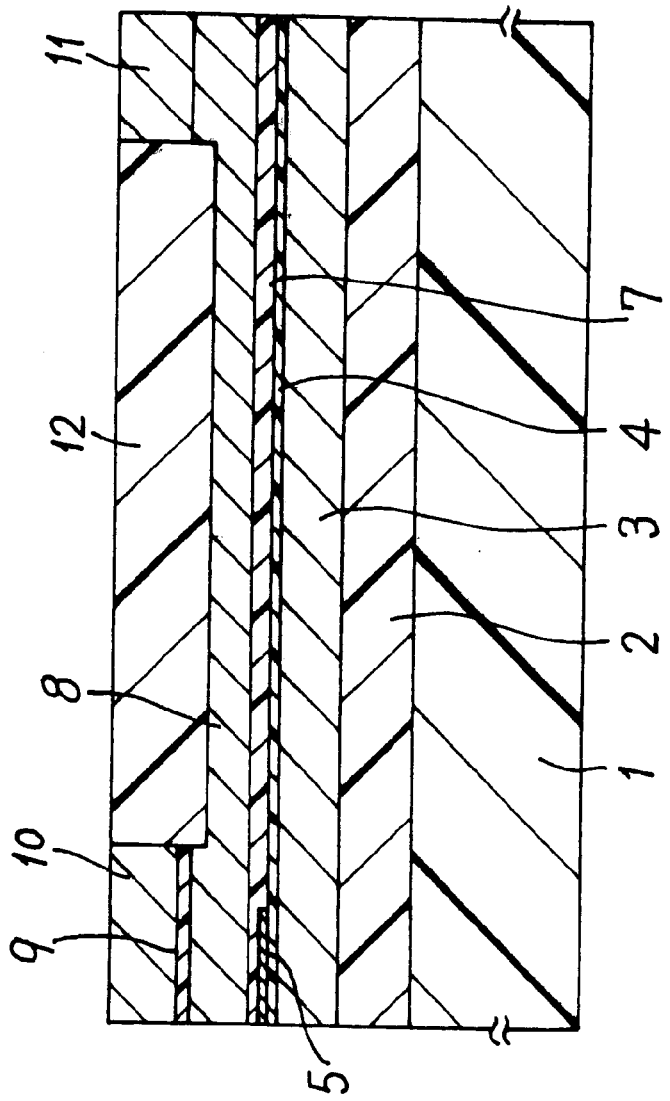

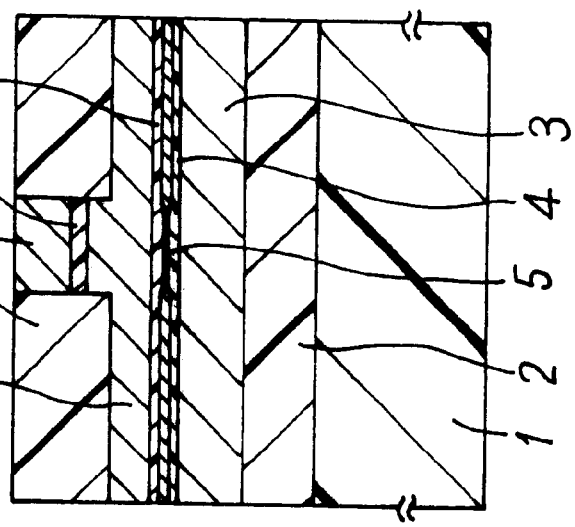
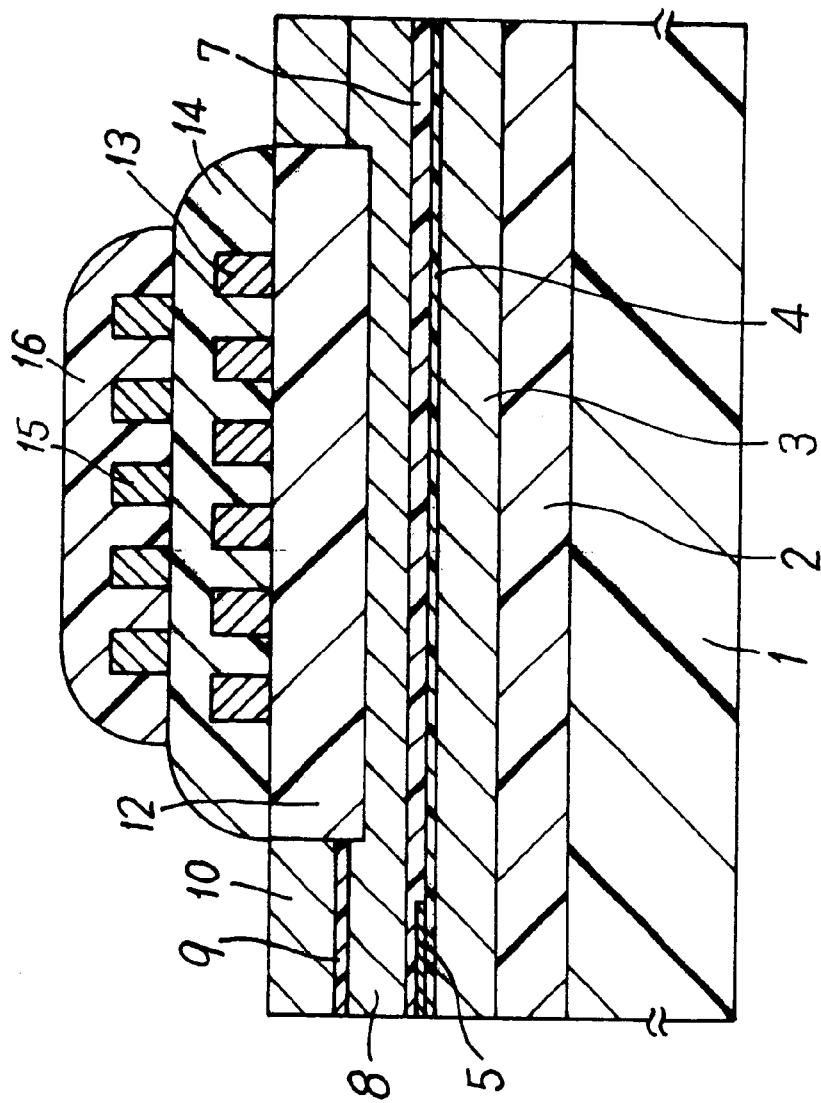

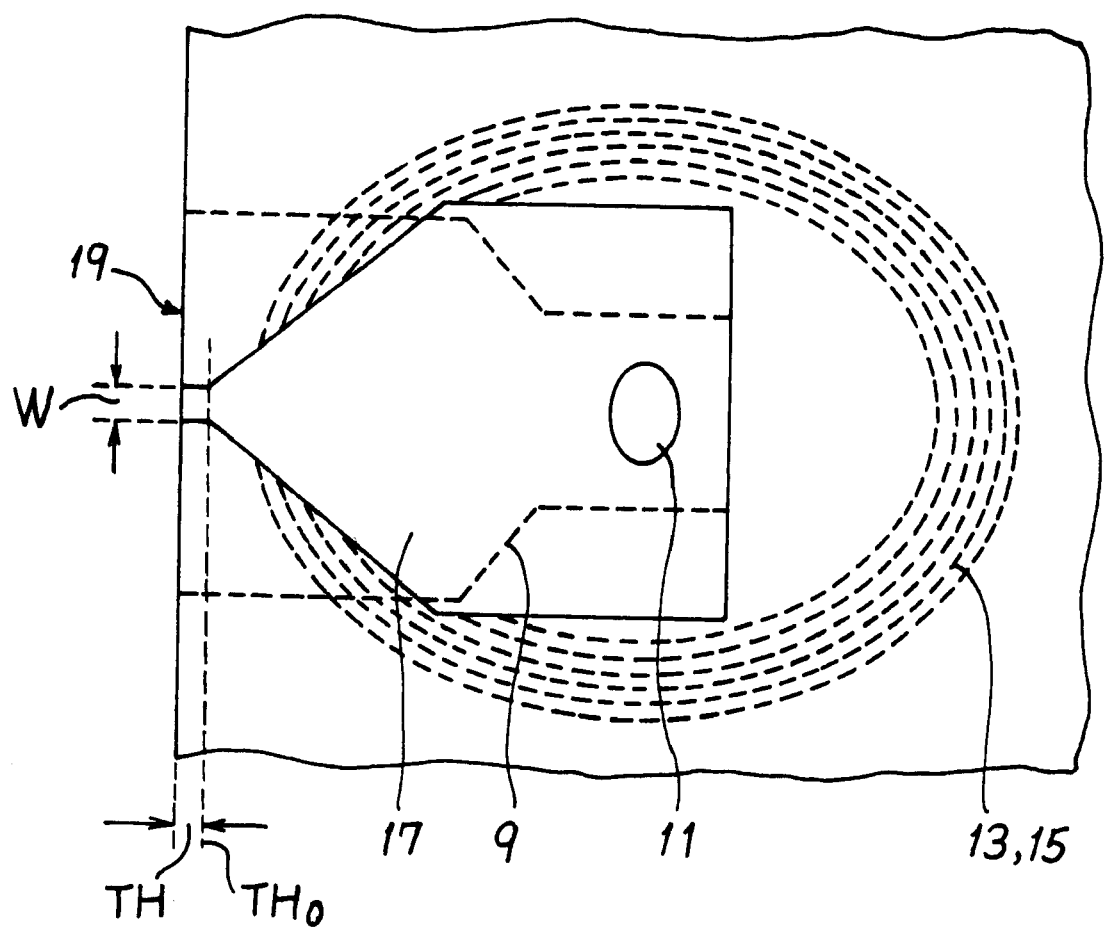
FIG_8
PRIOR ART

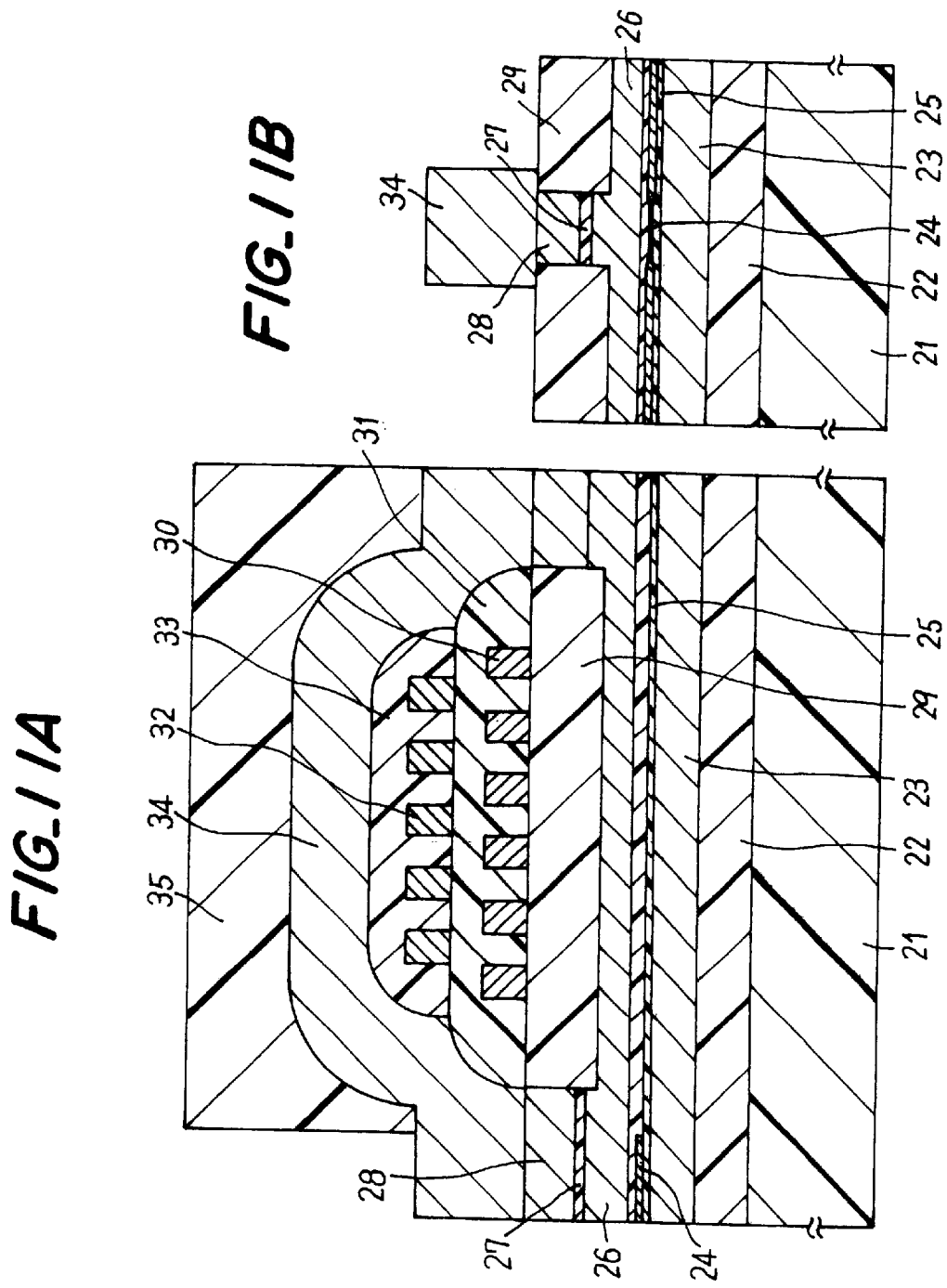

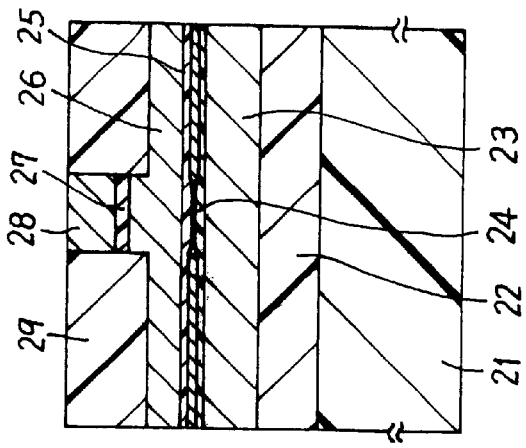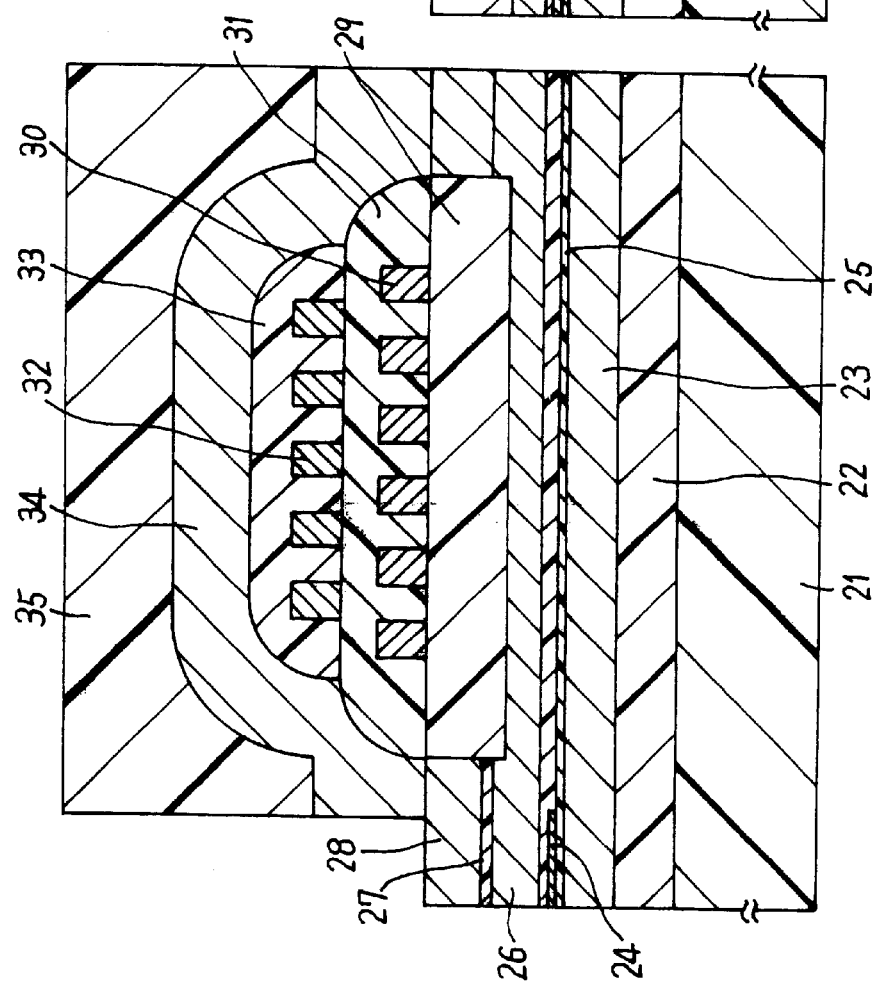

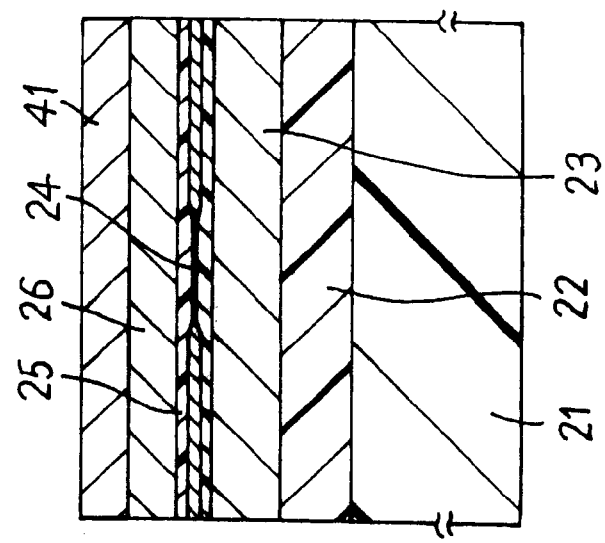
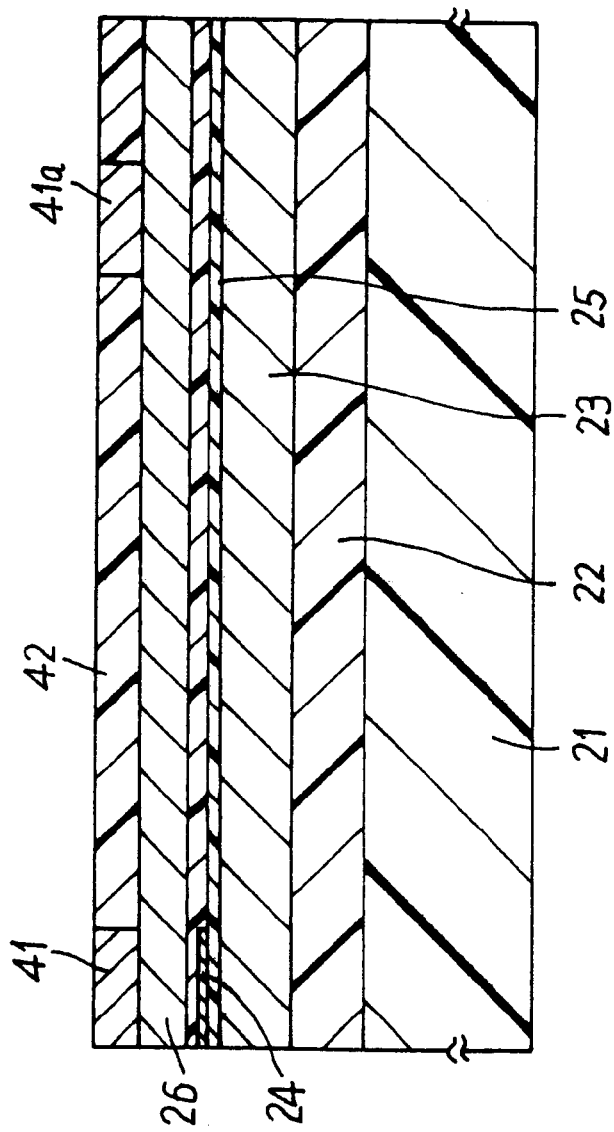
FIG. 15B
FIG. 15A

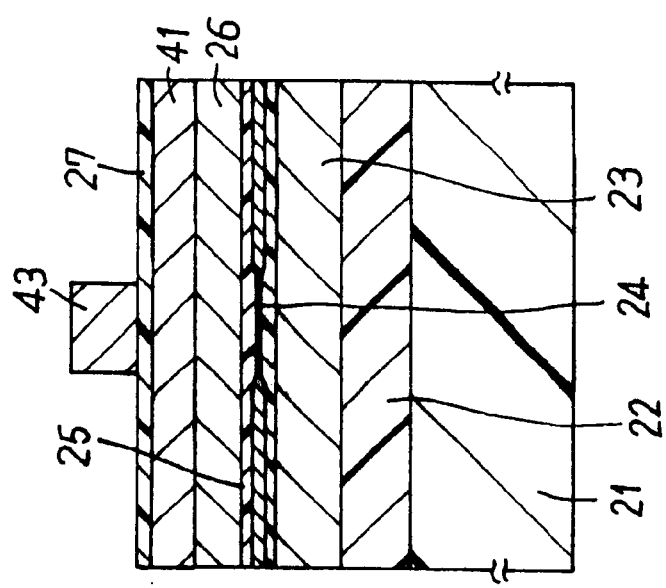
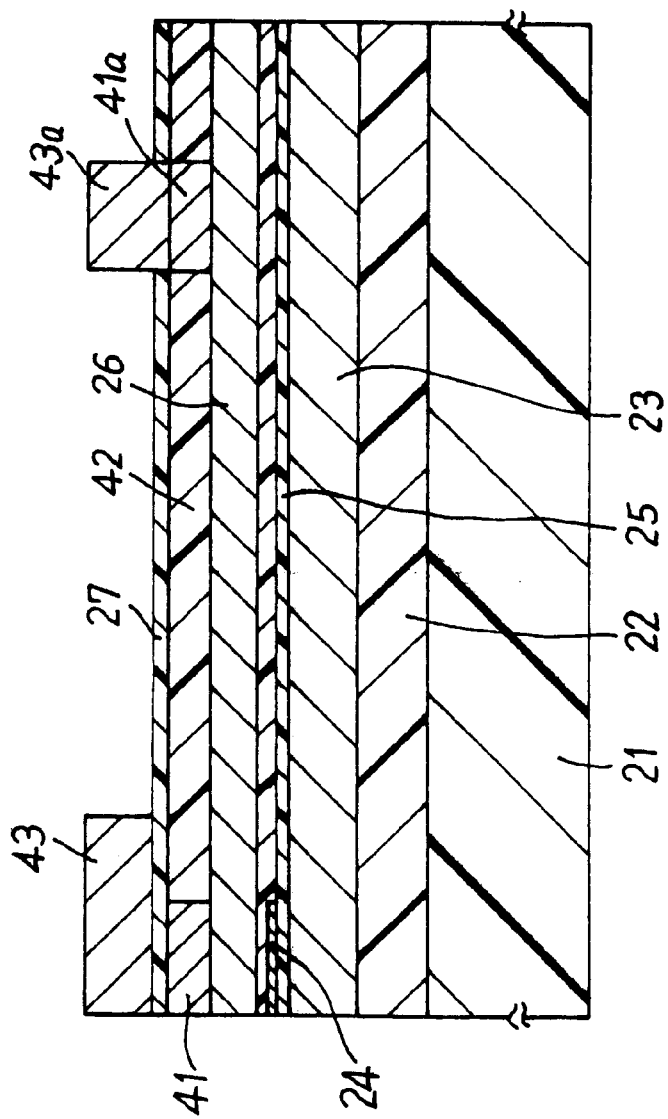

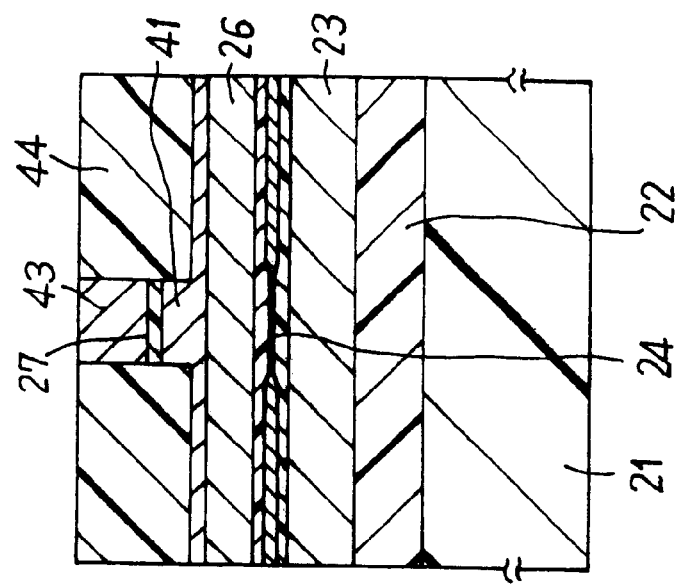
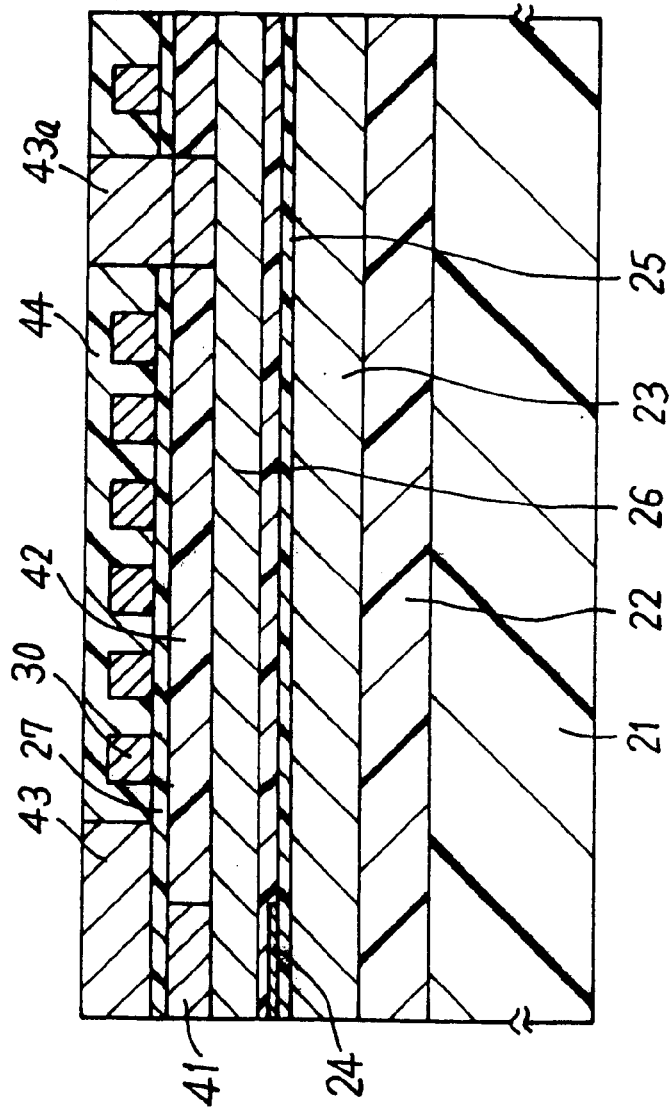

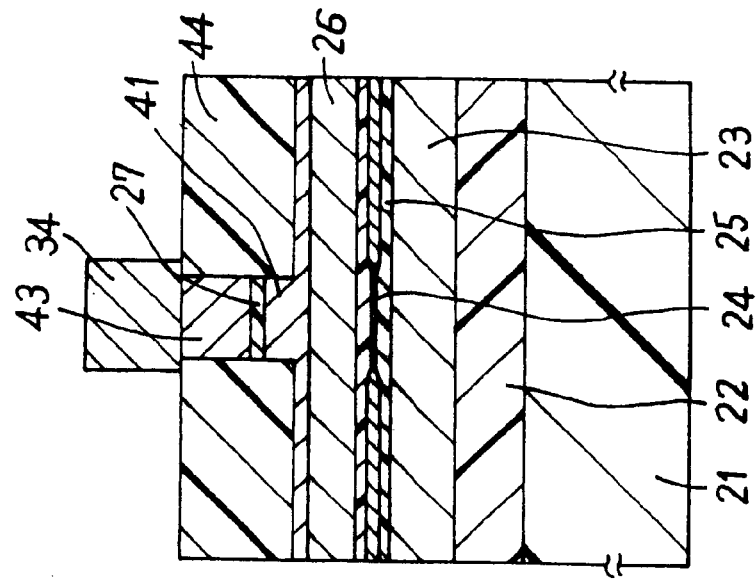
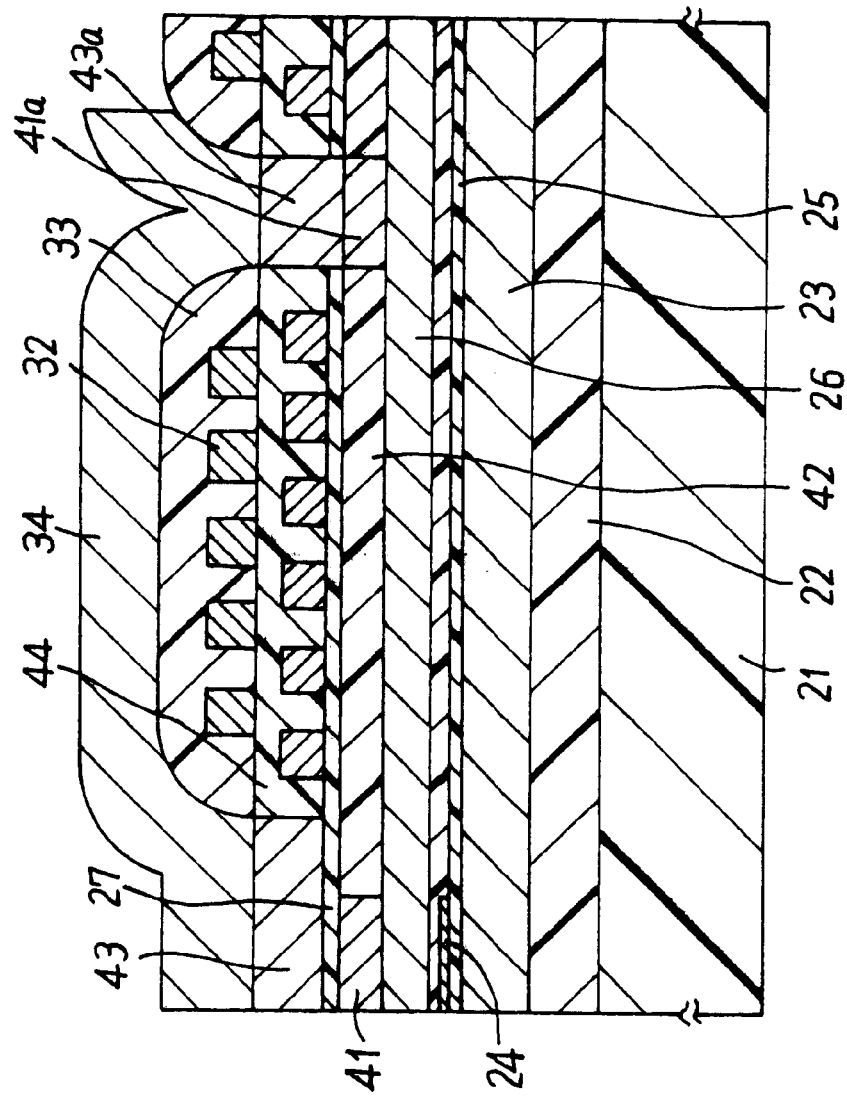
FIG._18A
FIG._18B

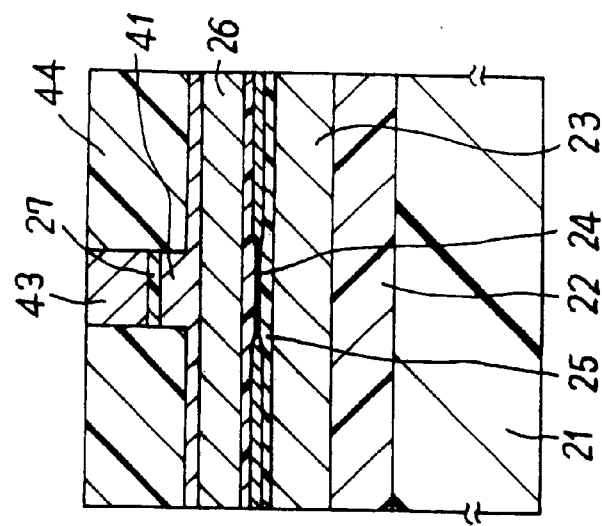
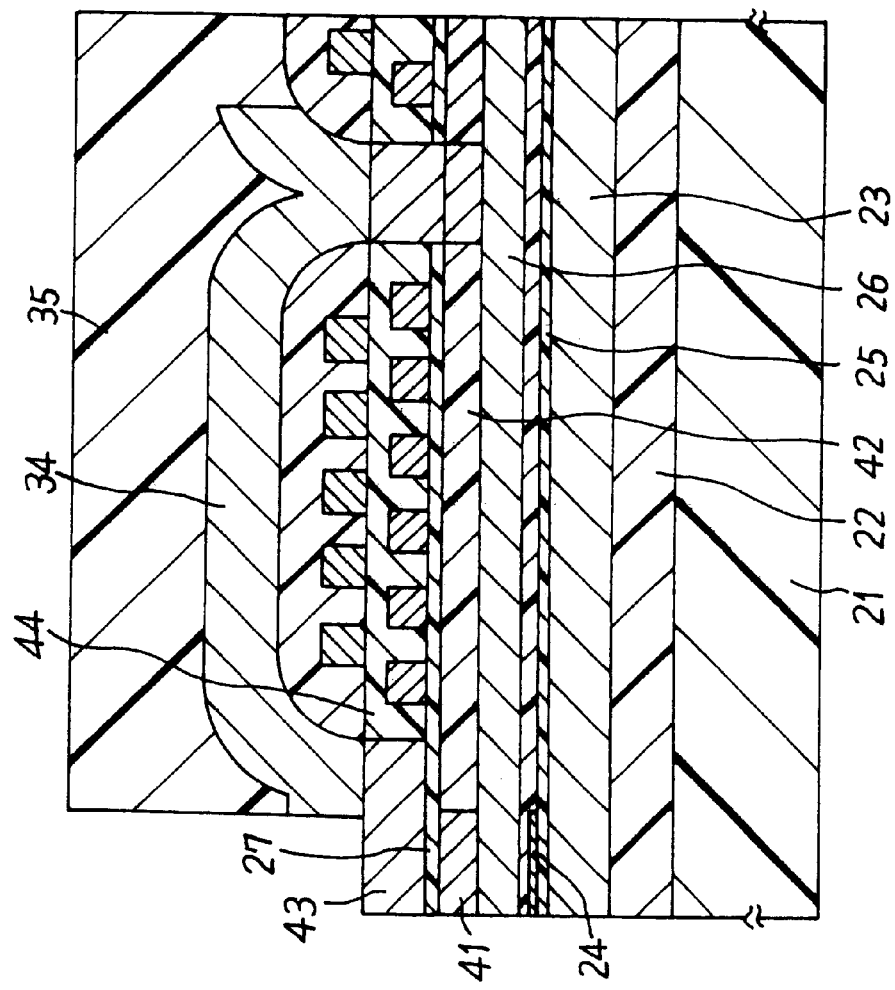
FIG._19A
FIG._19B

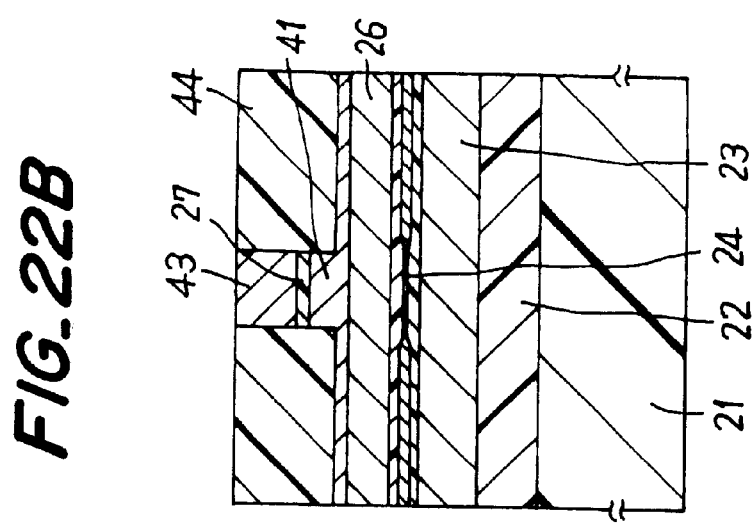
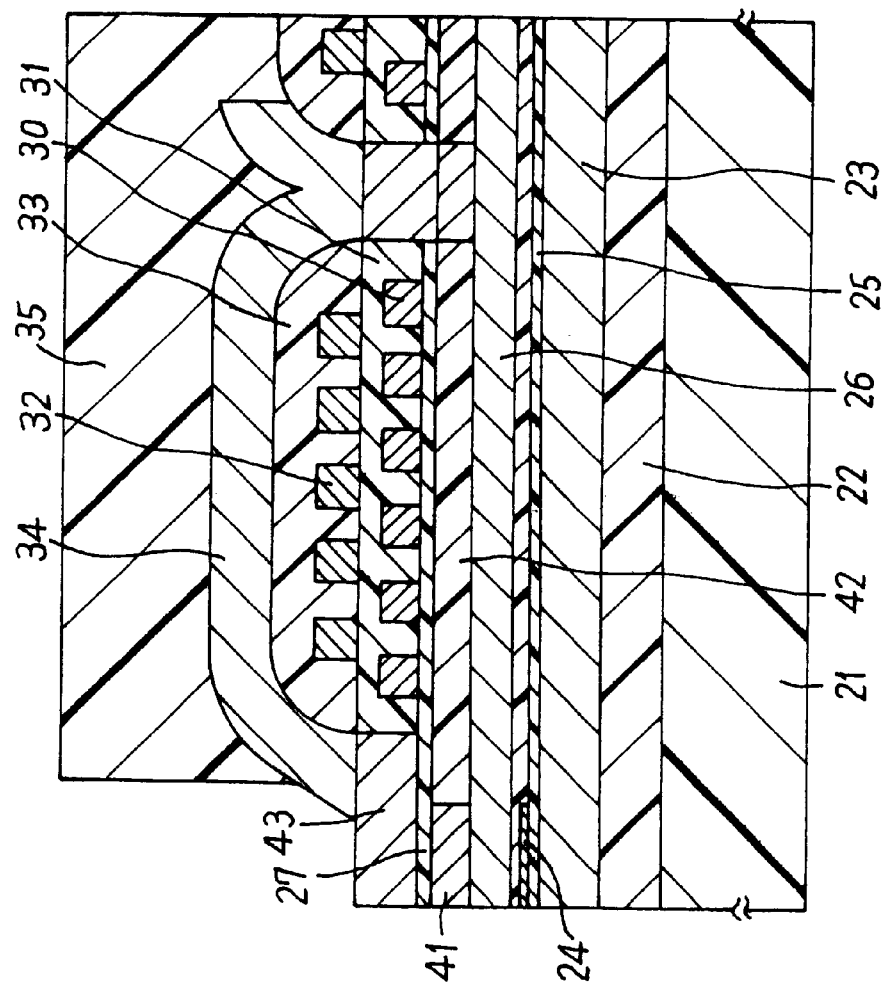

COMPOSITE TYPE THIN FILM MAGNETIC HEAD THAT INCLUDES A POLE CHIP AND A TOP POLE AND AN INSULATING LAYER THAT ACTS AS AN ETCHING STOPPER DURING ANISOTROPIC ETCHING

BACKGROUND OF THE INVENTION

1. Field of the Invention

This invention relates to an inductive type thin film magnetic head and a method for manufacturing the same, particularly a composite type thin film magnetic head comprising a writing inductive type thin film magnetic head and a reading magnetoresistive effective type thin film magnetic head which are stacked and supported by a substrate and a method for manufacturing the composite type thin film magnetic head.

2. Related Art Statement

Recently, with the development of surface recording density in hard disk devices, composite type thin film magnetic heads are required to have excellent characteristics.

Then, a composite type thin film magnetic head comprising an inductive type thin film magnetic head for writing and a magnetoresistive effective type thin film magnetic head for reading which are stacked on a substrate is suggested and practically used. Although as the reading magnetoresistive element, a magnetoresistive effective type thin film magnetic head using a normal anisotropic magnetoresistive (AMR) effect has been generally employed, magnetoresistive effective type thin film magnetic heads using a giant magnetoresistive (GMR), each head having a several times as large resistance variation as the AMR element, are developed. Moreover, magnetoresistive effective type tin film magnetic heads using a tunneling junction magnetoresistive (TMR) effect are developed.

In this specification, each of these AMR elements, GMR elements and TMR elements is generically called as a "magnetoresistive effective type thin film magnetic head" or a "MR reproducing element" in brief.

The use of the AMR element enables a surface recording density of several giga bits/inch$^2$ to be realized, and the use of the GMR element enables the surface recording density to be more enhanced. Such a high surface recording density can realize a hard disk having a large capacity of more than 10G bites.

A height of a magnetoresistive reproducing element (MRH: MR Height) is a factor to determine a performance of a reproducing head composed of such a magnetoresistive reproducing element. The MR height is a distance between an air bearing surface and the end of the magnetoresistive reproducing element exposing to the air bearing surface. In a manufacturing process of a thin film magnetic head, a desired MR height is obtained by controlling the polishing amount of its air bearing surface when polishing the air bearing surface.

On the other hand, with the characteristics of the reproducing head being enhanced, the characteristics of the writing head is required to be developed. The development of the surface recording density requires an enhancement of a track density in a magnetic recording medium. Thus, a width of a write gap in an air bearing surface has to be narrowed to a submicron order from a several micron order, and for realizing it, a semiconductor processing technique is employed.

A throat height is a factor to determine a performance of a writing thin film magnetic head. The throat height is a distance to an edge of an insulating layer to electrically separate a thin film from its air bearing surface, which is desired to be as short as possible. The narrowing of the throat height is determined by a polishing amount from the air bearing surface.

Thus, for enhancing the performance of the composite type thin film magnetic head composed of the stacked writing inductive type thin film magnetic head and reading magnetoresistive effective type thin film magnetic head, it is important to balance the writing inductive type thin film magnetic head with the reading magnetoresistive effective type thin film magnetic head.

FIGS. 1–8 shows successive manufacturing steps of a conventional normal composite type thin film magnetic head. In each figures, reference "A" depicts a cross sectional view, taken on a surface perpendicular to an air bearing surface, and reference "B" depicts a cross sectional view, taken on a surface parallel to the air bearing surface.

First of all, as shown in FIG. 1, an insulating layer 2 made of alumina ($Al_2O_3$) is formed in a thickness of about 5–10 μm on a substrate 1 made of alumina-titanium-carbon (AlTiC), for example, on which a bottom shielding layer 3 constituting one magnetic shield layer to protect a MR reproducing element from an external magnetic field is formed, of permalloy, in a thickness of 2–3 μm. Then, as shown in FIG. 2, a bottom shield gap layer 4 is sputter-formed, of alumina, in a thickness of about 100–150 μm, and thereafter a magnetoresistive layer 5 constituting the MR reproducing element is formed, of a material having a magnetoresistive effect, in a thickness of several ten nm, and processed into a desired shape with a precise mask alignment. Subsequently, conductive layers 6a and 6b to connect the magnetoresistive element to an external circuit are formed. A top shield gap layer 7 is formed, of alumina, on a thickness of 100–150 nm, and thereafter, a top pole 8 is formed, of permalloy in a thickness of 3 μm. The top pole 8 functions as a top shield to magnetically shield the MR reproducing element as well as the above bottom shield layer 3, but does as a bottom pole of the writing thin film magnetic head importantly, so it is called as a "bottom pole" hereinafter.

Next, as shown in FIG. 3, on the bottom pole 8 is formed, of a non magnetic material, for example, alumina, a write gap layer 9 having a thickness of about 200 nm, on which a magnetic layer is formed of a high saturated magnetic flux density such as permalloy (Ni: 50 wt %, Fe: 50 wt %) or iron nitride (FeN). Then, a top pole 10 is formed into a desired shape through a precise mask alignment. The width W of the pole chip 10 defines the track width. Thus, high surface recording density requires to narrow the width W of the pole chip 10. In this case, a connecting member 11 to magnetically connect the bottom pole 8 and a top pole to be formed later is formed at the same time, which can make easy open a through hole after mechanical polishing or chemical mechanical polishing (CMP).

Then, as shown in FIG. 4, for preventing the broadening of the effective writing track width, that is, for preventing the broadening of the magnetic flux of one pole in writing data, the write gap layer 9 and the bottom pole are etched by ion beam etching such as ion milling to form a trim structure. Thereafter, an insulating layer 12 is formed, of alumina, in a thickness of 3 μm, and is flattened by CMP so as to have the same level surface as the pole chip 10.

Thereafter, as shown in FIG. 5, a first thin film coil 13 is formed, of Cu, for example, so as to be supported in insulated separation by an insulating layer 14, the surface of which is flattened. Then, a second thin film coil 15 is formed on the surface of the insulating layer 14 so as to be supported in insulated separation by an insulating layer 16.

The thus obtained assembly is fired at 250° C., for example, to flatten the surface of the insulating layer 16 to support the second thin film coil 15. Thereafter, as shown in FIG. 6, a top pole 17 made of permalloy is selectively formed alongside a desired pattern, in a thickness of 3 μm, on the pole chip 10 and the insulating layers 14, 16, and an overcoat layer 18 is formed, of alumina, on the surface over the thus obtained assembly.

Finally, the sides of the assembly are polished to form an air bearing surface (ABS) 19 opposing to a magnetic recording medium. In the forming process of the air bearing surface 19, the magnetoresistive layer 5 is polished, too and thereby, a MR reproducing element 20 is obtained. In this way, the above throat height TH and MR height MRH are determined.

In a real thin film magnetic head, pads to electrically connect the thin film coils 13, 15 and the MR reproducing element 20 are formed, but omitted in the figures.

FIG. 7 is a plan view, as shown in FIG. 4, showing the state in which the pole chip 10 and the connecting member 11 are formed on the write gap layer 9 so as to have the same surface level as that of the insulating layer 12. In the figure, the top pole 17 to be formed later is denoted as a virtual line. The pole chip 10 extends from the end of the air bearing surface to the standard position $TH_0$ as throat height=0, and the magnetic pole portion of the top pole 17 is formed so as to cover the pole chip entirely.

FIG. 8 is a plan view showing the state in which the overcoat layer 18 is removed from the complete composite type thin film magnetic head shown in FIG. 6. As is shown in the figure, the width W of the magnetic pole portion in the pole chip 10 and top pole 17 is narrowed. Then, since the track width in recording into a magnetic recording medium is determined by the width W, the width is narrowed as small as possible for realizing a high surface recording density. Hereupon, for simplifying the figure, the thin film coils 13 and 15 are shown in concentric circle.

In the past, a special problem in forming a thin film magnetic head is a difficulty of forming, finely, a coil convex portion covered with a photoresist insulating layer, particularly a top pole alongside its slope (Apex) after forming the thin film coil.

Conventionally, the top pole is formed as follows: A magnetic material such as permalloy is plated on a coil convex portion having a height of about 7–10 μm. Then, a photoresist is applied in a thickness of 3–4 μm, and thereafter, is processed into a given pattern by a photolithography technique. If the pattern resist on the heap-like coil convex portion requires a minimum thickness of 3 μm, the photoresist is applied in a thickness of 8–10 μm in the bottom part of the slope.

Moreover, the top pole formed on the surface of the coil convex portion having a vertical interval of about 10 μm and the flattened write gap layer is required to be processed finely as the track width is narrowed. However, if a narrowed pattern having a width of about 1 μm is formed from a thick photoresist film having a thickness of 8–10 μm, the pattern breaks due to the reflected light from the light used in exposing the photoresist film and the resolution is degraded due to the large thickness of the photoresist. Thus, it is very difficult to pattern a narrowed top pole to form a narrowed track precisely.

Accordingly, for writing data with a recording head having a pole chip whereby a narrowed track width can be formed as the above conventional example, a two-divided structure-thin film magnetic head, formed by forming the pole chip and thereafter, connecting a top pole to the pole chip, is proposed. That is, the two-divided structure-thin film magnetic head has a pole chip to determine a track width and a top pole to induce a magnetic flux.

As mentioned above, however, the thin film magnetic head including the pole chip and the top pole has the following problems:

(1) In the case of requiring a track width of submicron order, particularly about 0.5 μm, the magnetic pole portion of the top pole as well as that of the pole chip is required to be micro-processed in submicron order, which has difficulty being realized by the conventional photolithography.

(2) Since the relative position of the pole chip 9 and the top pole 17 is determined by an alignment of photolithography, as is viewed from the air bearing surface, the center line of the pole chip can shift from the center line of the top pole. Consequently, the magnetic flux leaked from the top pole may record data, and thereby, the effective track width become large, resulting in the side write of recording data in the adjacent track mistakenly. For preventing the side write, the track width is required to be large, so that a high surface recording density can not be obtained.

For ironing out the side write, a thin film magnetic head in which a forefront of a top pole is receded from an air bearing surface is suggested, and an example of the thin film head is described in Kokai publication No. 10-55516. Although in the conventional thin film magnetic head, the top pole is formed in a given pattern by photolithography, the photolithography has difficulty receding the forefront of the top pole from the air bearing surface by a given distance precisely in forming the magnetic pole portion of the top pole having a submicron order width. Particularly, it is very difficult to micro-process the forefront of the top pole without the fluctuation of the dimension and shape of the pole chip, and besides, the micro-processing degrades the characteristics and process yield of the thin film magnetic head.

Although in the thin film magnetic head in which the forefront of the top pole is receded from the air bearing surface, the part in between the forefront of the top pole and the air bearing surface is embedded with an overcoat layer, the overcoat layer made of alumina is peeled off in the polishing process to form the air bearing surface because the forefront of the magnetic pole portion of the top pole is almost perpendicular to the surface of the pole chip.

Moreover, in the thin film magnetic head having the pole chip and the top pole, the opposite surface of the pole chip to the air bearing surface has to be a standard position of throat height=0. Thus, the pole chip can not extended backward beyond the standard position, and thereby, the contacting area between the pole chip and the magnetic pole portion of the top pole is small, resulting in the saturation of the magnetic flux in the contacting area.

SUMMARY OF THE INVENTION

It is an object of the present invention to provide a thin film magnetic head having a pole chip and a top pole capable of being micro processed into a given size and inhibiting the fluctuation in the center positions between the pole chip and the magnetic pole portion of the top pole when the center positions are viewed from an air bearing surface, regardless of receding the forefront of the magnetic pole portion from the air bearing surface.

It is another object of the present invention to provide a thin film magnetic head in which a magnetic flux is not saturated in a contacting area between a pole chip and a top pole by making large the contacting area, regardless of receding the top pole from an air bearing surface.

It is still another object of the present invention to provide a method capable of manufacturing the thin film magnetic head having the above excellent characteristics in good liability and efficiency.

It is further object of the present invention to provide a manufacturing method of a thin film magnetic head so that in the thin film magnetic head, an overcoat layer may not be peeled off when polishing an air bearing surface, regardless of receding a top pole from the air bearing surface.

This invention relates to a thin film magnetic head comprising:

a first magnetic layer constituting one pole of an inductive type thin film magnetic head, a write gap layer formed on a surface of the first magnetic layer, a pole chip extending alongside the opposite surface of the write gap layer to the first magnetic layer, its forefront being positioned so as to be exposed to an air bearing surface, an insulating layer formed on the surface on which the pole chip is provided so as to have the same flat surface level as that of the pole chip, a thin film coil formed, in insulated separation, on the opposite surface of the insulating layer to the first magnetic layer, a second magnetic head extending alongside the opposite surfaces of the pole chip and the thin film coil for the first magnetic layer to constitute the other pole of the inductive type thin film magnetic head, having its forefront receded backward from the air bearing surface and magnetically connected to the first magnetic layer in the opposite side to the air bearing surface, an overcoat layer extending from the air bearing surface so as to cover the pole chip and the second magnetic layer, and a substrate to support the first magnetic layer, the write gap layer, the pole chip, the insulating layer, the thin film coil, the second magnetic layer and the overcoat layer, the forefront of the second magnetic layer being receded from the air bearing surface by anisotropic etching with the insulating layer as an etching stopper.

In a preferred embodiment of the thin film magnetic head according to the present invention, the thin film magnetic head further comprises, between the substrate and the first magnetic layer, a third magnetic layer extending backward from its forefront constituting the air bearing surface to constitute one shield for a magnetoresistive effective type thin film magnetic head, a shield gap layer extending alongside the opposite surface of the third magnetic layer to the substrate, and a magnetoresistive element arranged in the shield gap layer, in electrically and magnetically insulated separation, so that its forefront may expose to the air bearing surface, the first magnetic layer constituting the other shield for the magnetoresistive effective type thin film magnetic head, the magnetoresistive effective type thin film magnetic head for reading and the inductive type thin film magnetic head being stacked each other so as to be supported by the substrate to constitute a composite type thin film magnetic head.

In such an embodiment, the forefront of the second magnetic layer is preferably formed so that the part of the forefront may be receded more distantly from the air bearing surface as the part leaves the pole chip. Such a structure can not peel off the overcoat layer when polishing the air bearing surface. In this case, the angle of gradient of the forefront of the second magnetic surface from the direction parallel to the air bearing surface is preferably 30–60°.

Moreover, in a preferred embodiment of the thin film magnetic head according to the present invention, a second pole is provided between the first magnetic layer and the write gap layer and the thin film coil is composed of a two-layered thin film coil. Then, a second insulating layer to support the first layer-thin film coil in insulated separation is formed flat so as to have the same level as the first pole chip. In this case, by extending the first pole chip backward beyond the standard position of throat height=0, without changing the standard position of throat height=0 determined by the opposite end of the second pole chip to the air bearing surface, the contacting area between the first pole chip and the second magnetic layer can be large. Thus, even though the magnetic pole portion is miniaturized, the saturation of the magnetic flux at the magnetic pole portion can be prevented.

Thin invention also relates to a method for manufacturing a thin film magnetic head comprising the steps of:

forming a bottom pole extending backward from an end of an air bearing surface so as to be supported by a substrate, forming a write gap layer so as to cover at least the magnetic pole portion of the bottom pole, forming a pole chip on the write gap layer, forming an insulating layer on the bottom pole so as to have the same level flat surface as that of the pole chip, forming a thin film coil on a surface of the insulating surface with insulation-separated by an insulating material, forming a magnetic film constituting a top pole on the surfaces of the pole chip and the thin film coil and thereafter, forming the forefront of the magnetic film receded backward from the air bearing surface by anisotropic etching with the insulating layer as an etching stopper, forming an overcoat layer so as to cover the top pole, and polish-forming the air bearing surface.

A preferred embodiment of the manufacturing method of the thin film magnetic head according to the present invention comprises, before forming the bottom pole, the steps of:

forming, on the substrate, a bottom shield extending backward from the end constituting the air bearing surface, and forming, on a surface of the bottom shield, a magnetoresistive element insulation-separated by a shied gap layer, the bottom pole being formed on a surface of the shield gap layer so as to constitute a top pole of a reading magnetoresistive effective type thin film magnetic head, whereby a composite type thin film magnetic head, having the magnetoresistive effective type thin film magnetic head and an inductive type thin film magnetic head which are stacked each other and supported by the substrate, is produced.

In the manufacturing method of the thin film magnetic head according to the present invention, the anisotropic etching to form the forefront of the top pole is preferably ion beam etching. In this case, it is preferable that the ion beam etching is carried out at an angle of 30–60° from the perpendicular direction to the surface of the pole chip and thereby, the forefront of the top pole is formed in slope so that the part of the forefront may be receded distantly from the air bearing surface as the part leaves the pole chip.

Moreover, in a preferred embodiment of the manufacturing method of the thin film magnetic head according to the present invention, on the shield gap layer is formed the bottom pole doubling as a top shield, on which a bottom pole chip extending from the air bearing surface is formed and an insulating layer is formed so as to have the same level flat surface as the bottom pole chip. Then, the write gap layer is formed on the flat surface of the bottom pole chip and the insulating layer. A top pole chip is formed on the write gap, and thereafter, a first layer-thin film coil is formed so as to be embedded in the insulating layer and a second layer-thin film coil is formed on the surface of the insulating surface.

BRIEF DESCRIPTION OF THE DRAWINGS

For a better understanding of this invention, reference is made to the attached drawings, wherein:

FIGS. 1A–6B are cross sectional views showing successive steps in the manufacturing method of the conventional composite type thin film magnetic head, FIG. 8 is a plan view showing the thin film magnetic head structure in the step of FIG. 6, FIGS. 9A–12B are cross sectional views showing successive steps in a first embodiment of the manufacturing method of the composite type thin film magnetic head according to the present invention.

DETAILED DESCRIPTION OF PREFERRED EMBODIMENTS

The first embodiment in the thin film magnetic head and the manufacturing method of the same according to the present invention will be described hereinafter, with reference to FIGS. 9–12. In these figures, reference "A" denotes a cross sectional view, taken on the surface perpendicular to the air bearing surface and reference "B" denotes a cross sectional view, taken on the surface parallel to the air bearing surface. Normally, in manufacturing a thin film magnetic head, many heads are produced on a wafer at the same time. Thus, although the end of each head does not appear before the wafer is cut into each head, for convenience of the explanation, the thin film magnetic head is shown as it has its end.

Figure 1A:
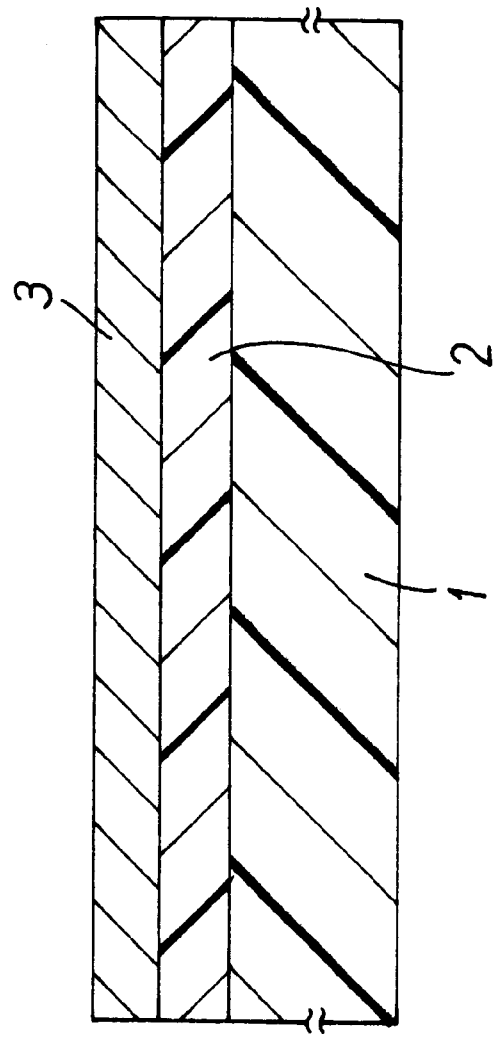
Figure 1B:
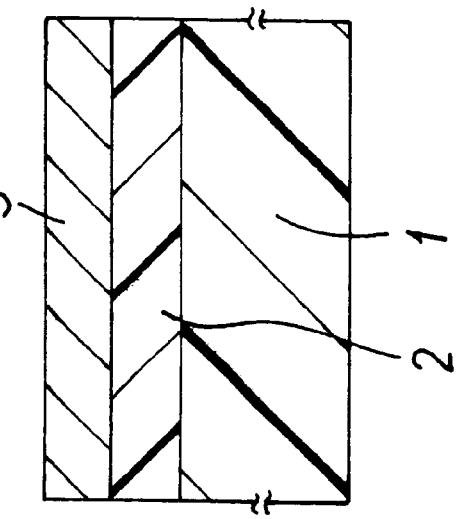
Figures 2A, 2B:
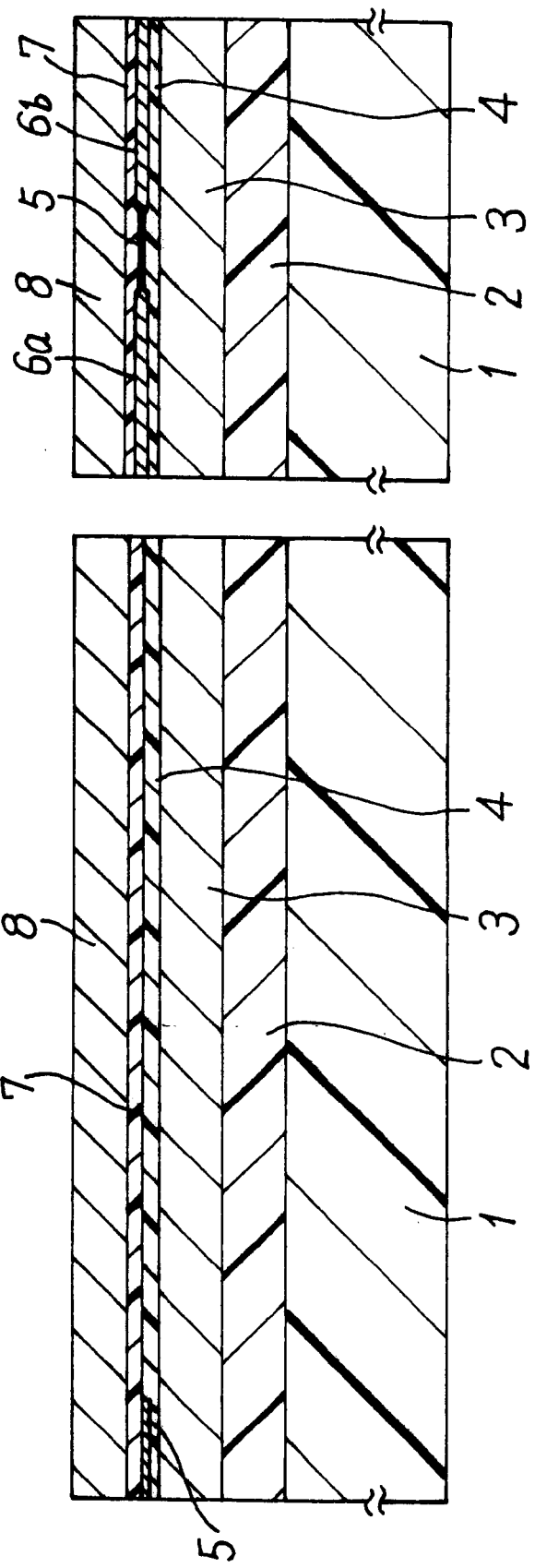
Figure 6B:
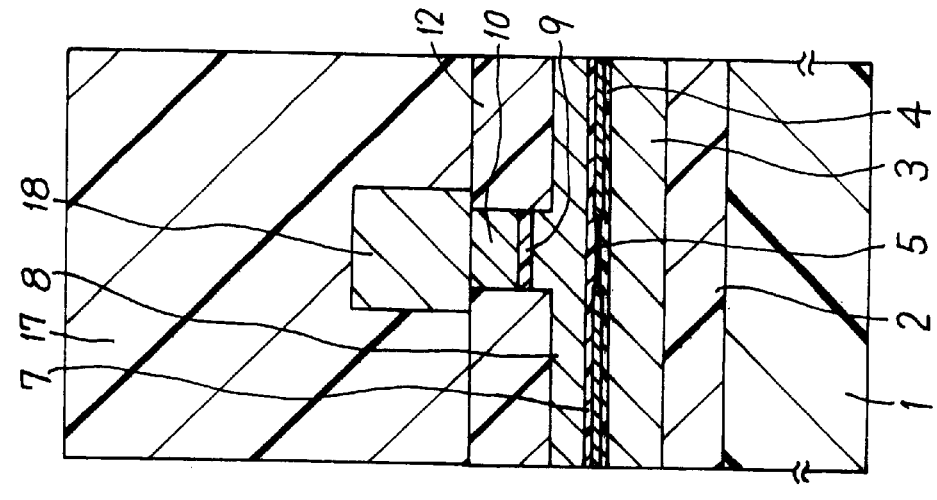
Figure 6A:
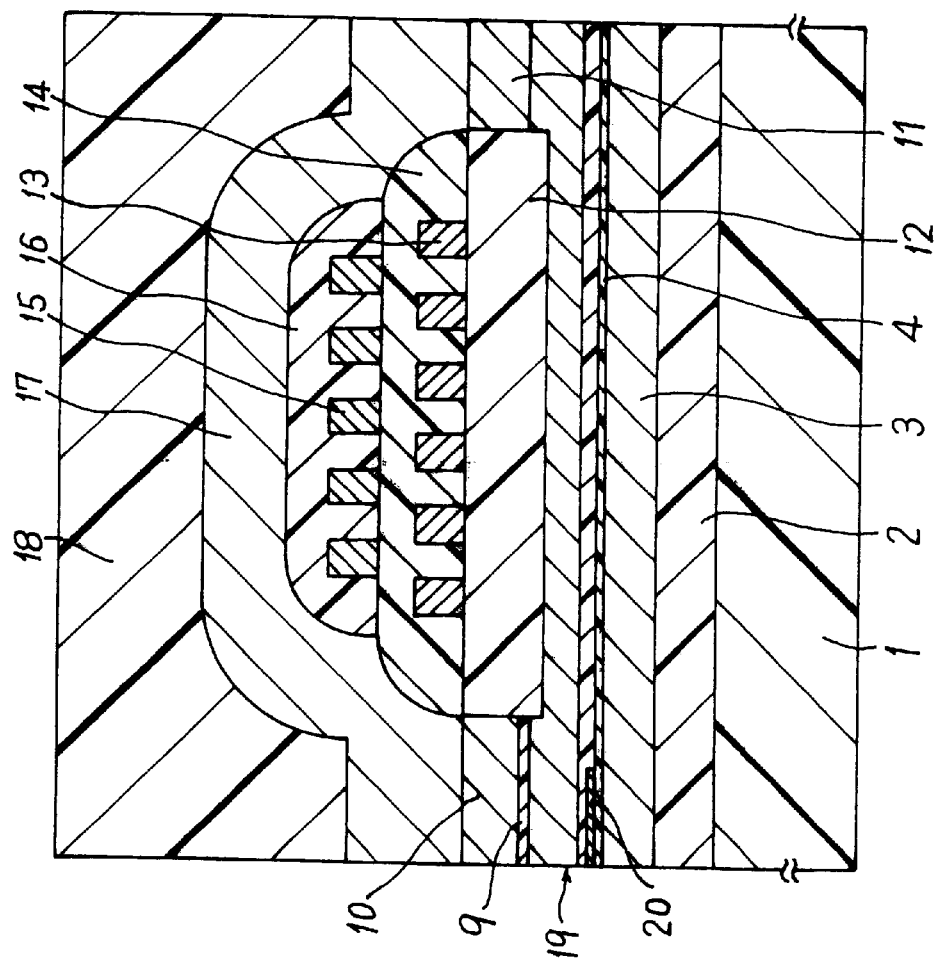
Figure 7:
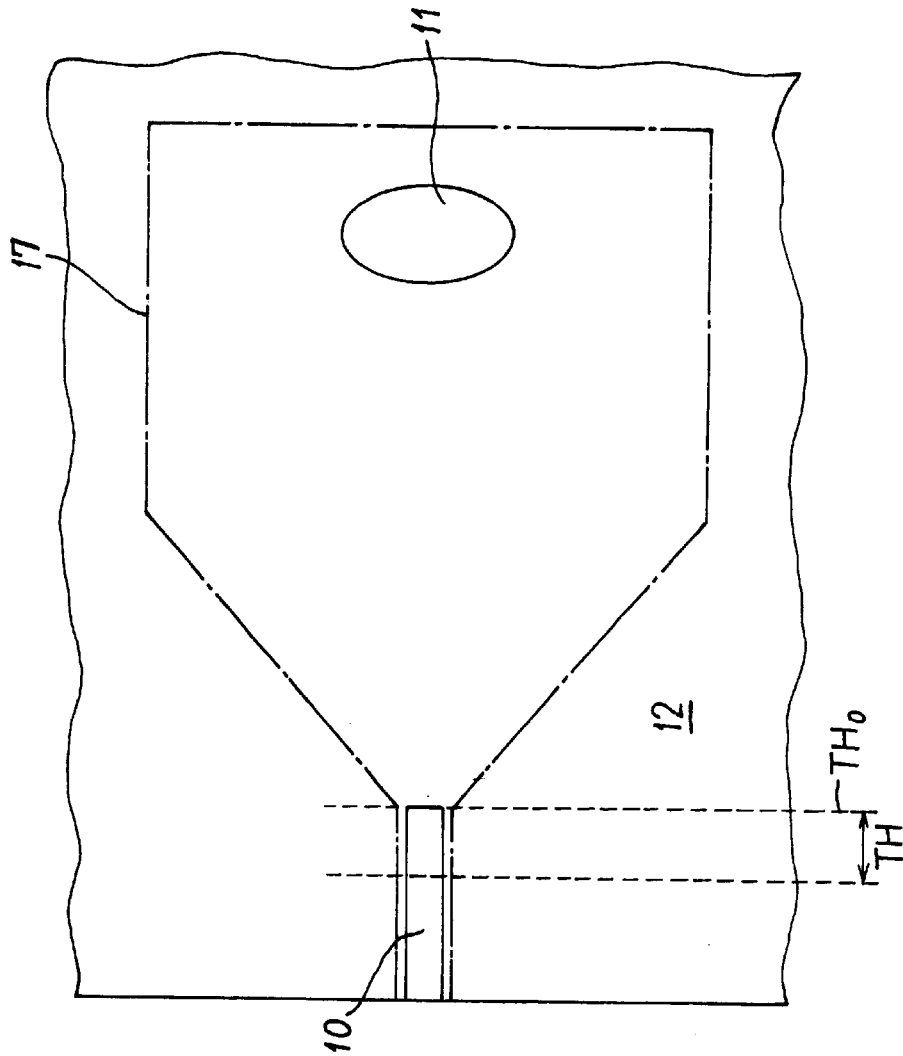
FIG. 7 is a plan view showing the thin film magnetic head structure in the step of FIG. 4.
Figure 9B:
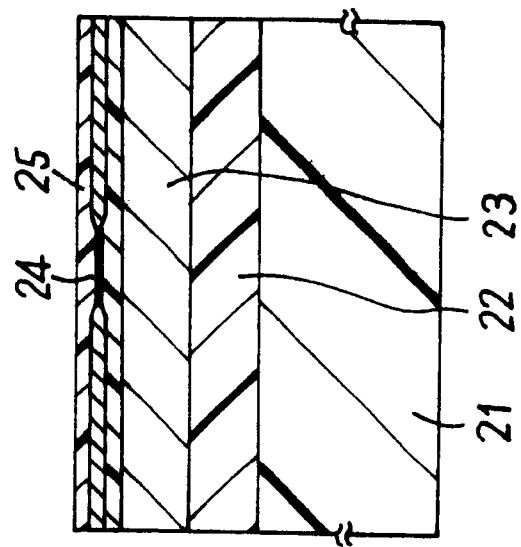
Figure 9A:
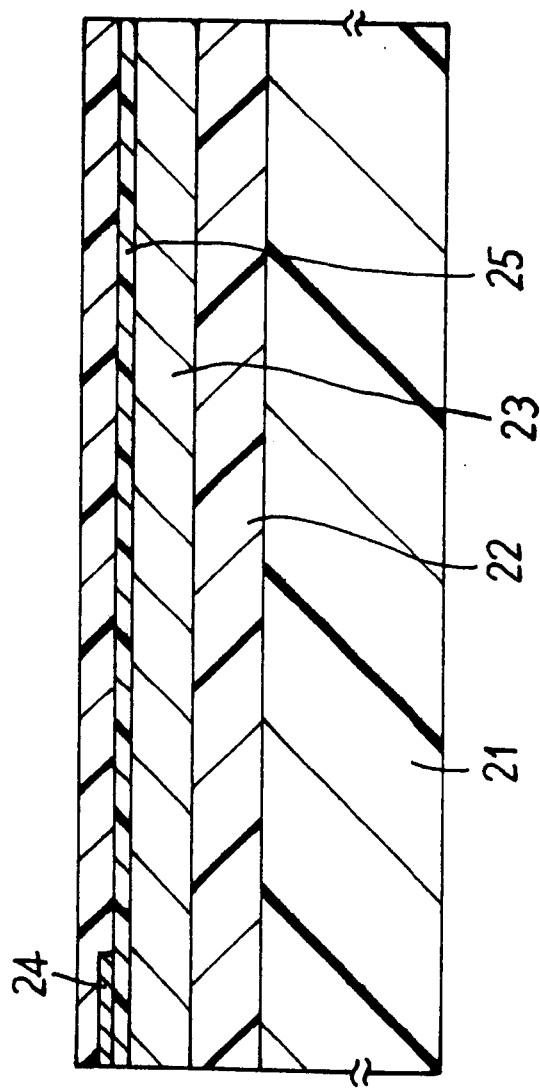

The process of forming the thin film coil from a first step in this embodiment is the same as that in FIGS. 1–5. That is, as shown in FIG. 9, on one surface of a substrate body 21 having a several mm thickness made of aluminum-titanium-carbon (AlTiC) is formed, in a thickness of about 10 $\mu$m, an insulating film 22 made of alumina, on which a bottom shield 23 constituting one shield of a magnetoresistive effective type thin film magnetic head is formed alongside a given pattern. Then, a shield gap film 25 having an embedded GMR film 24 therein is formed on the bottom shield 23.

Figure 10A:
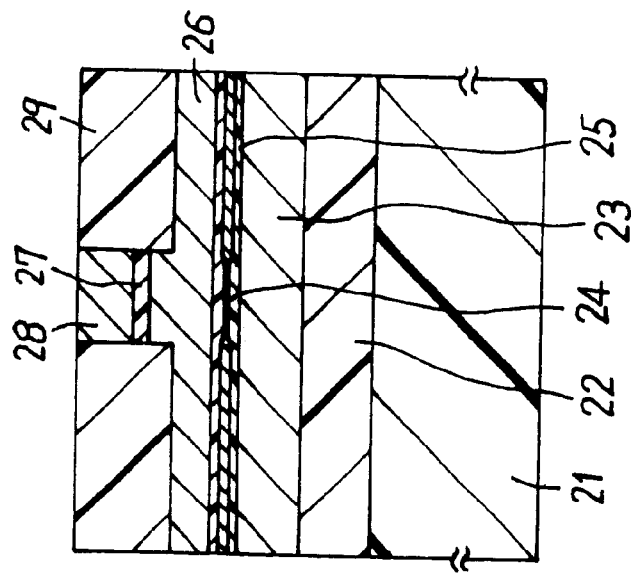
Figure 10B:
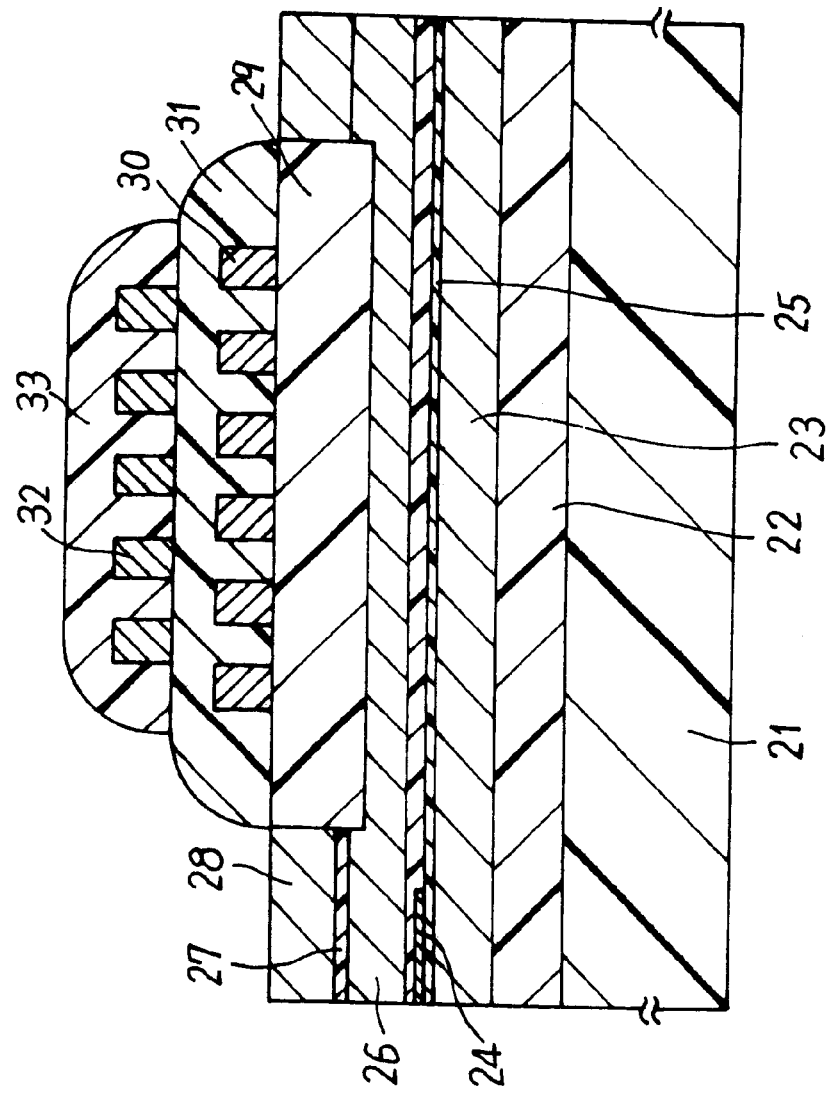

Next, as shown in FIG. 10, on the shield gap layer 25 is formed, in a thickness of 3 $\mu$m, a bottom pole 26 constituting the other shield of the magnetoresistive effective type thin film magnetic head and one pole of an inductive type thin film magnetic head, on the surface of the magnetic pole portion of which a write gap layer 27 is formed. Then, a pole chip 28 is formed and thereafter, with the pole chip as a mask, the thus obtained assembly is etched to form a trim structure. After an insulating layer 29 is formed, a first thin film coil 30 is formed on the flattened surface of the insulating layer 29 by CMP so as to be embedded in an insulating layer 31, on which a second thin film coil 32 is formed so as to be embedded in an insulating layer 33.

In this invention, as shown in FIG. 11, a top pole 34 is formed by depositing a permalloy material in a 3–4 $\mu$m thickness with a plating method and thereafter, a photoresist 35 is formed in a given pattern. The photoresist 35 serves as a mask in the next anisotropic etching step, and as shown in FIG. 11, is receded backward from the air bearing surface by a given distance. The distance is equal to the receding distance of the forefront of the top pole 34 from the air bearing surface.

In the invention, the term "anisotropic" means that the etching process, such as the reactive ion etching (RIE) process, proceeds in a certain direction. Thus, "anisotropic" means the directivity of the etching process. This is contrasted with isotropic etching wherein the etching process does not have directivity.

Subsequently, the exposed part of the top pole 34 is selectively removed by an anisotropic etching with the photoresist 35 as a mask, in this embodiment, ion beam milling, one of ion beam etching, and as shown in FIG. 12, the forefront of the top pole is receded from the air bearing surface. In the anisotropic etching, the insulating layer 29 formed so as to have the same level surface as the surface of the pole chip 28 around the pole chip 28 serves as an etching stopper. Thus, the over-etching does not change the shape, particularly the width of the pole chip 28 and thereby, a desired track width can be obtained.

Figure 13:
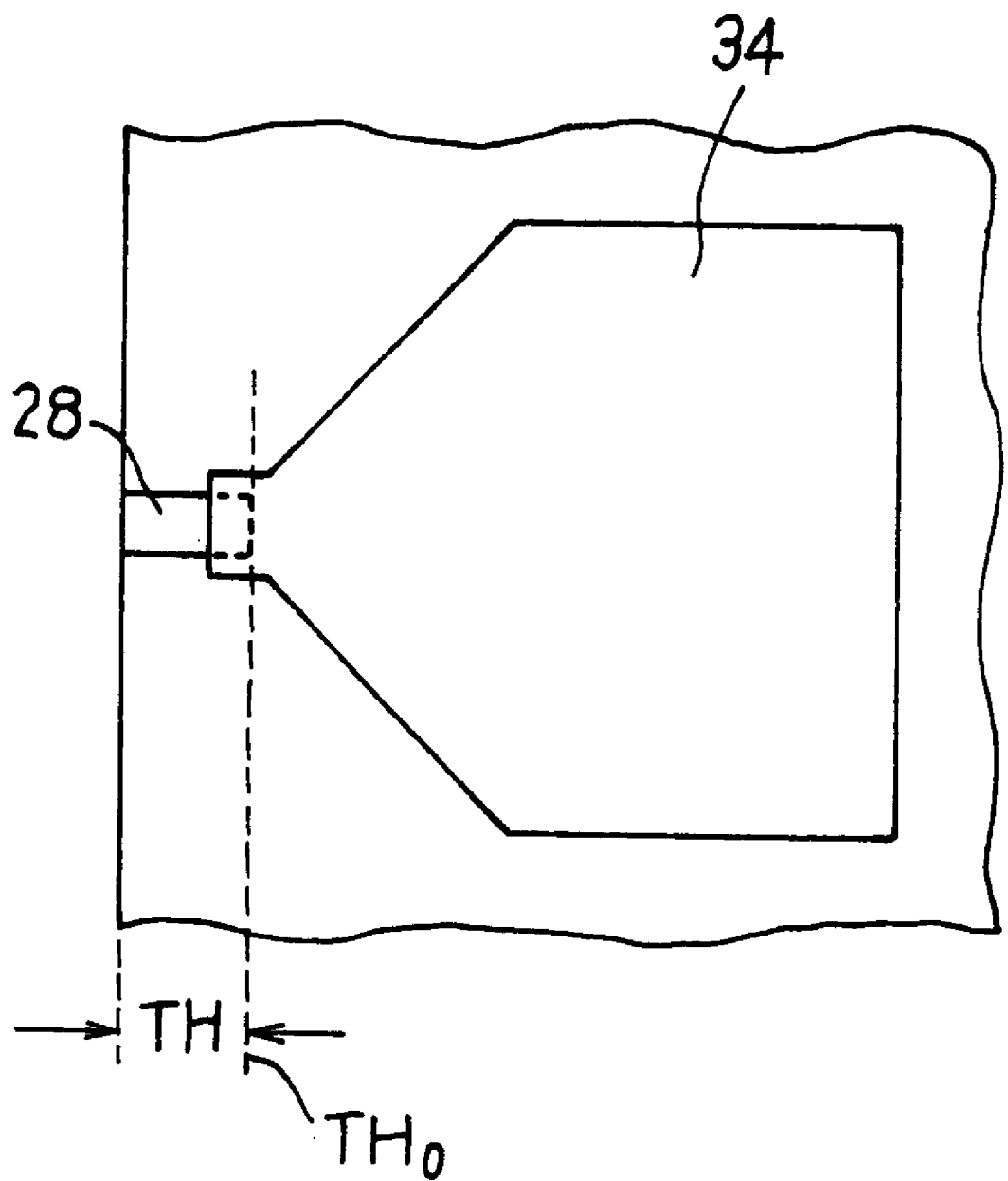
FIG. 13 is a plan view showing the thin film magnetic head in the step of FIG. 12, FIGS. 14A–20B are cross sectional views showing successive steps in a second embodiment of the manufacturing method of the composite type thin film magnetic head according to the present invention.

FIG. 13 is a diagrammatic plan view showing the state in which the forefront of the magnetic pole portion of the top pole 34 is receded from the air bearing surface. Hereupon, for clarifying the figure, the photoresist 35 is omitted. In this embodiment, the back end of the pole chip 28 opposite to the air bearing surface is a standard position $TH_0$ of throat height=0.

In this way, the anisotropic etching using the insulating layer 29 as an etching stopper is carried out to recede the forefront of the magnetic pole portion of the top pole 34 from the air bearing surface and thereafter, the photoresist 35 is removed. Then, an overcoat layer is formed and the air bearing surface is polished.

FIGS. 14–21 show the successive steps in the second embodiment of the thin film magnetic head according to the present invention. In this embodiment, the same part as that of the former embodiment is denoted as the same reference as that of the former embodiment.

Figure 14B:
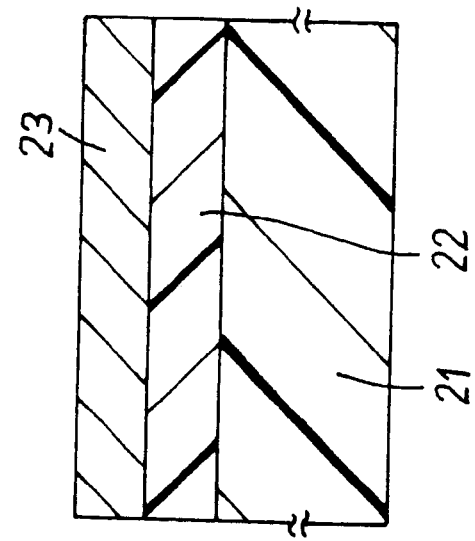
Figure 14A:
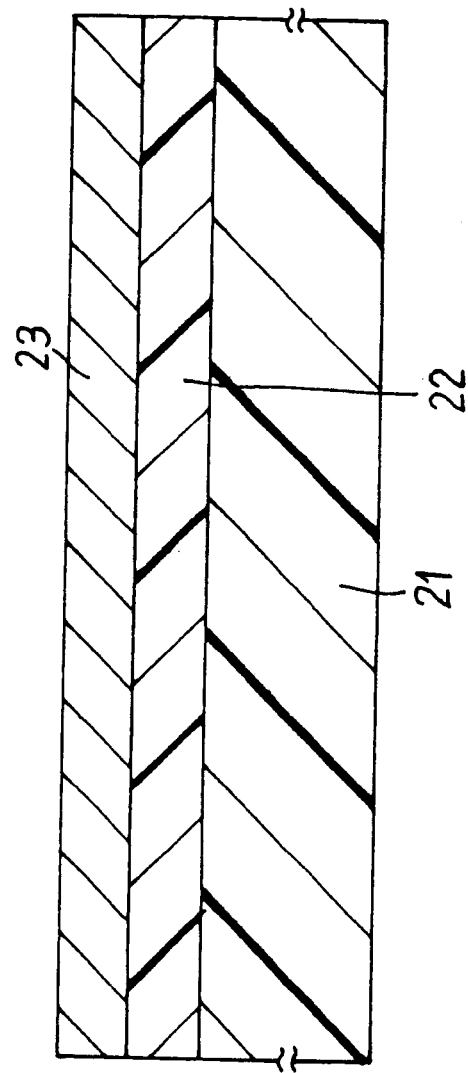

As shown in FIG. 14, on a surface of an AlTiC substrate body 21 is formed, in a thickness of about 5 $\mu$m, an alumina insulating layer 22, on which a bottom shield 23 is selectively formed in a thickness of around 3 μm by plating a permalloy material alongside a given pattern with a photoresist as a mask.

Next, an alumina layer is formed in a thickness of 4–6 μm, but is not shown the figure. Next, as shown in FIG. 15, a GMR layer 24 and a conductive layer are formed so as to be embedded in a shield gap layer 25 made of alumina, and a bottom pole 26 is formed in a thickness of about 1–1.5 μm alongside a given pattern.

In this embodiment, subsequently, a bottom pole chip 41 is formed in a thickness of about 1–2 μm alongside a given pattern. Although in this embodiment, the bottom pole chip is formed into a given pattern by plating a parmalloy (NiFe: 80%, 20%) material, it may be made of another magnetic material having a high saturated magnetic flux like NiFe (45%, 55%) into a desired pattern by a plating method. Or the bottom pole may be formed through the patterning a film deposited from a NFe material, a FeZrN material by a sputtering method. At the same time when the bottom pole chip 41 is formed, a connecting member 41a is formed.

After an insulating layer 42 is formed, of alumina, in a thickness of 3–4 μm on the whole assembly, it is polished by CMP to expose the surface of the bottom pole chip 41 so as to have the same flattened surface as that of the insulating surface 42.

Next, as shown in FIG. 16, a write gap layer 27 is formed, of alumina, in a thickness of 0.2–0.3 μm on the flattened surface of the bottom pole chip 41 and the insulating layer 42 by a sputtering method, and thereafter, a top pole chip 43 is formed, of a permalloy (NiFe:45%, 55%) having a high saturated magnetic flux, in a thickness of 2.5–3.5 μm by a plating method. The top pole chip 43 may be also formed by the same method as in the bottom pole chip 41. At the same time when the top pole chip 43 is formed, a connecting member 43a is formed on the above connecting member 41a.

Subsequently, as shown in FIG. 17, the part of the write gap layer 27 around the top pole chip 43 is removed by reactive ion etching (RIE) using the top pole chip as a mask, and the bottom pole chip 41 is removed by almost 0.3–0.6 μm in the thickness direction to form a trim structure.

As the RIE gas, $BCl_2$, $Cl_2$, $CF_4$, $SF_4$ may be used. Next, a first layer-thin film coil 30 is formed in a thickness of 1.5–2.5 μm on the write gap layer 27, insulated separated by an insulating layer 44 made of alumina. As a material constituting the insulating layer 44, an inorganic insulating material such as a silicon oxide material, a silicon nitride material as well as alumina is exemplified. Moreover, after an alumina insulating layer is formed in a thickness of 3–4 μm over the thus obtained assembly, the surface of the top pole chip 43 is exposed by flattening the insulating layer with CMP. In FIG. 17, the alumina insulating layer is combined with an alumina insulating layer 44 to support the above thin film coil 30 in insulated separation.

Subsequently, as shown in FIG. 18, a second layer-thin film coil 32 is formed in a thickness of 1.5–2.5 μm on the flattened surface of the insulating layer 44 and covered with a photoresist 33. Then, a top pole 34 is formed in a thickness of 2–3 μm alongside a desired pattern. The top pole 34 may be made of a magnetic material having a high saturated magnetic flux.

Next, as shown in FIG. 19, a photoresist 35 is formed alongside a given pattern, using the photoresist as a mask, the forefront of the top pole 34 is receded from the air bearing surface by an anisotropic etching, in this embodiment, ion milling as one of ion beam etching. In the ion milling, since the insulating layer 44 surrounding the top pole chip 43 serves as an etching stopper, the shape of the top pole does not change due to the ion milling etching.

Figures 20A, 20B:
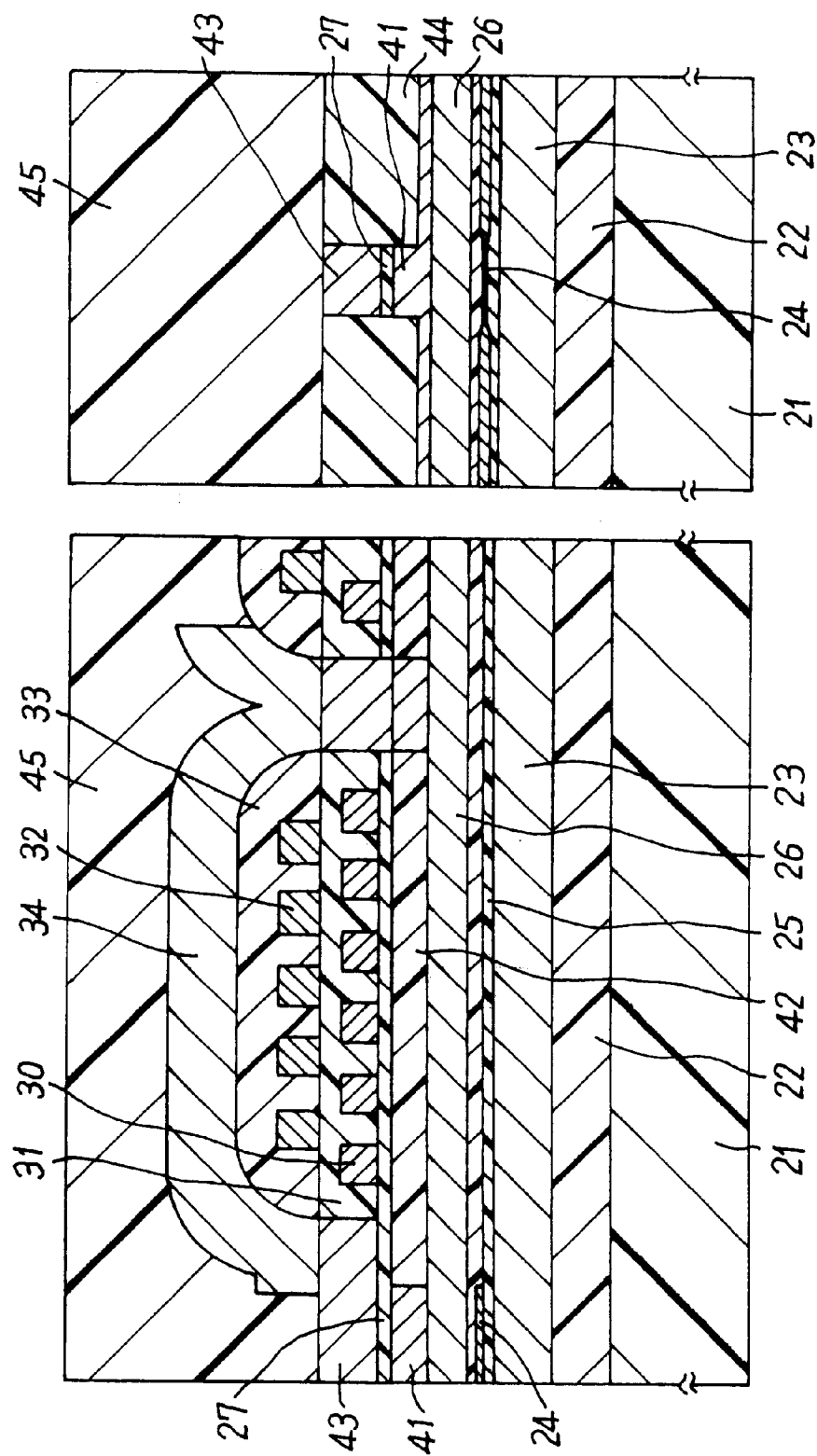

Lastly, as shown in FIG. 20, the photoresist 35 is removed and an overcoat layer 45 is formed, of alumina, in a thickness of 20–40 μm, and thereafter, the air bearing surface is polished.

In this embodiment, since the top pole chip 43 is extended backward beyond the bottom pole chip 41, even if the forefront of the top pole 34 is receded backward from a standard position of throat height=0 (the boundary position between the bottom pole chip 41 and the insulating layer 42), the contacting area between the top pole chip and the top pole can be large, so that the side-write can be prevented more precisely.

Figure 21:
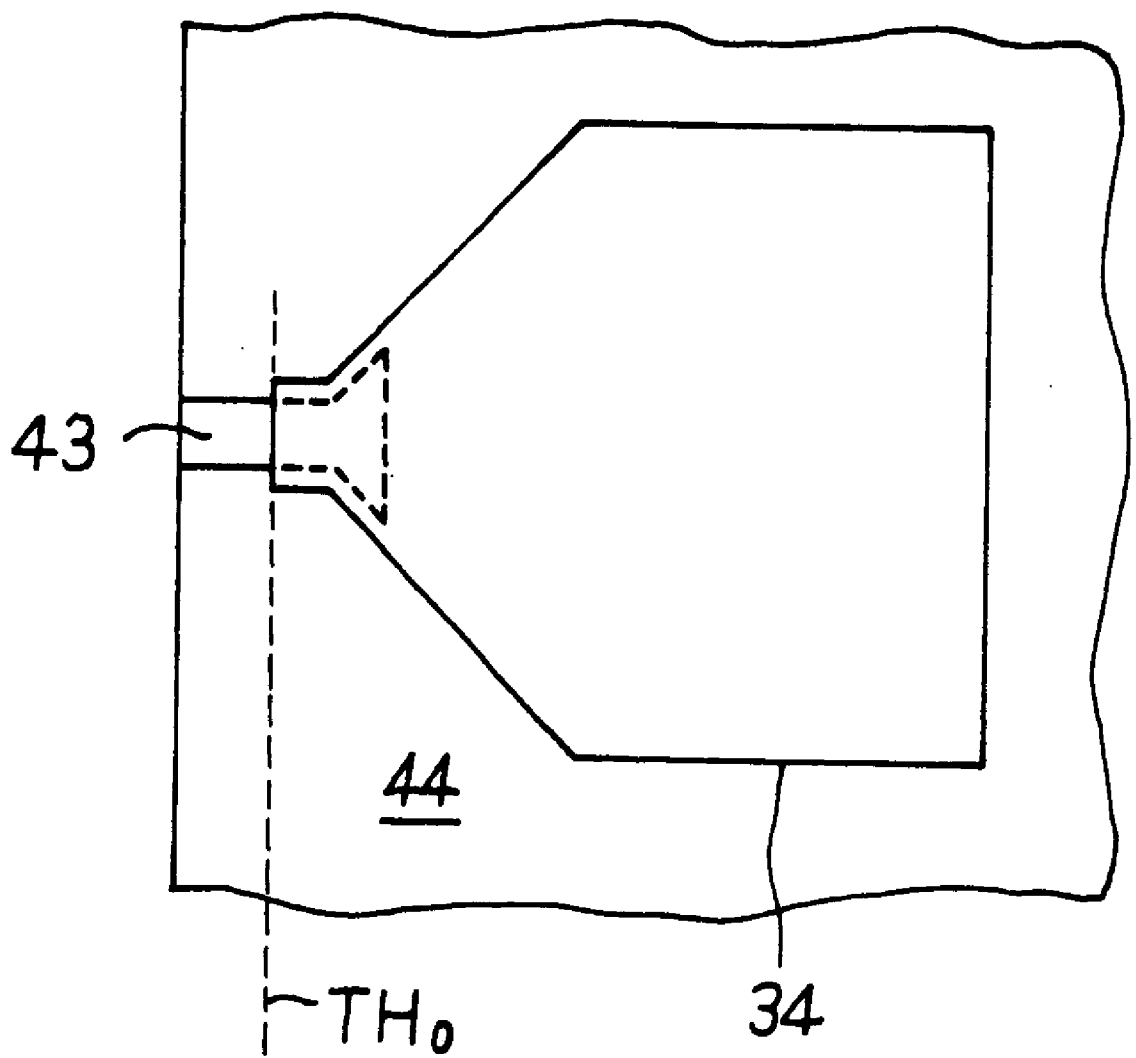
FIG. 21 is a plan view showing the thin film magnetic head structure in the step of FIG. 20, and FIGS. 22A–23B are cross sectional views showing successive steps in a third embodiment of the manufacturing method of the composite type thin film magnetic head according to the present invention.

In this case, as shown in FIG. 21, it is more preferable in making large the contacting area between the top pole chip and the top pole to extend the top pole chip backward beyond a standard position $TH_0$ of throat height=0 and widen its width gradually toward the backward. However, the width of the top pole chip 43 extending backward beyond the standard position $TH_0$ of throat height=0 is not always required to be widened gradually, and may be larger than the width of the magnetic pole portion, entirely.

In the above first and second embodiments, since the anisotropic etching to recede the forefront of the top pole 34 from the air bearing surface is carried out in the perpendicular direction to the surface of the pole chip, the forefront of the top pole is perpendicular to the surface of the pole chip, often resulting in the peeling off of the alumina material constituting the overcoat layer 45 when polishing the air bearing surface. An embodiment to iron out the problem will be explained as follows:

FIG. 22 shows a step of receding a forefront of a top pole from an air bearing surface in a third embodiment of the thin film magnetic head according to the present invention. A top pole 34 is formed as in the above second embodiment and thereafter, a photoresist 35 to be a mask in an anisotropic etching is formed. In this embodiment, the anisotropic etching is not carried out in a perpendicular direction to a surface of a top pole chip 43, but in an oblique direction at an angle of 30–60° from the perpendicular direction. The oblique etching make the forefront of the top pole 34 tapered.

Figure 23B:
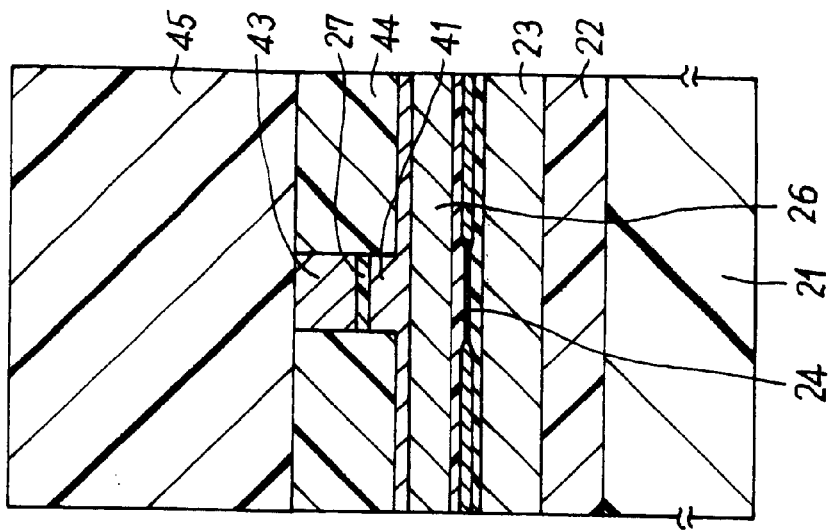
Figure 23A:
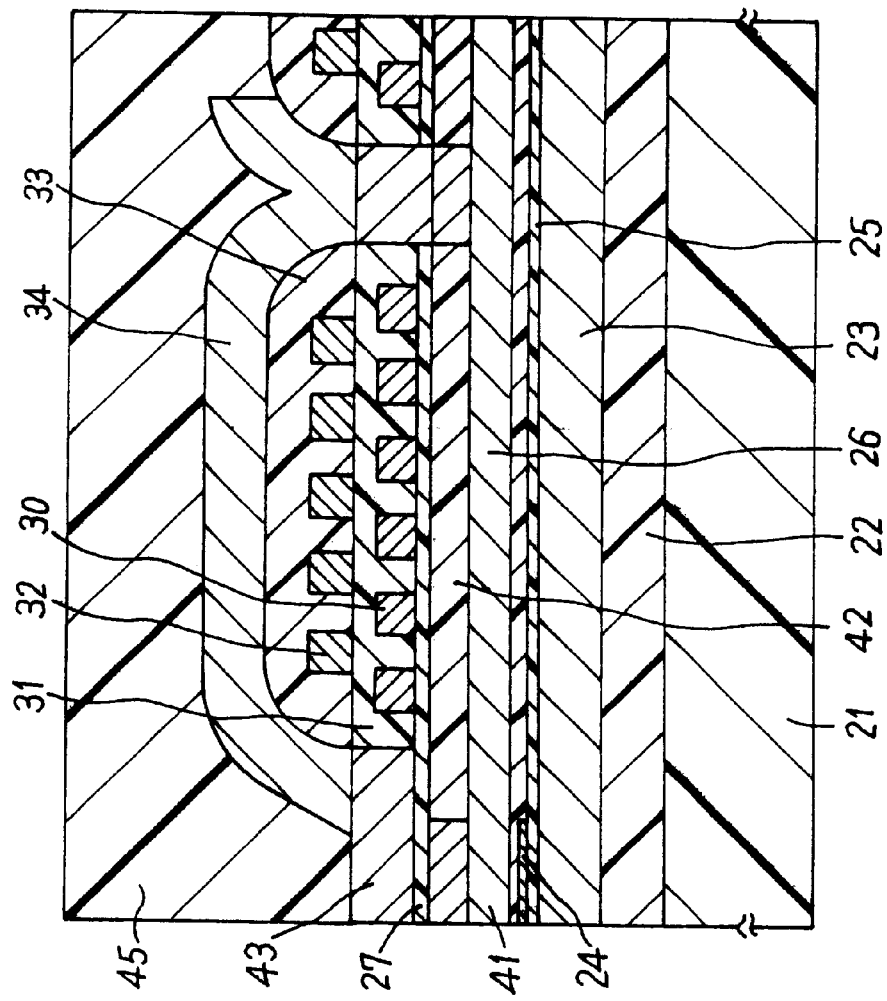

Subsequently, as shown in FIG. 23, the photoresist 35 is removed, and an overcoat layer 45 is formed. Thereafter, although an air bearing surface is polished, the alumina material constituting the overcoat layer is unlikely to be peeled off because the forefront of the top pole 34 is wider backward from the air bearing surface.

This invention is not limited to the above embodiments, but many variations and modifications may be made without departing the scope of this invention. For example, in the above embodiments, the composite type thin film magnetic head including the magnetoresistive effective type thin film magnetic head formed on the substrate and the inductive type thin film magnetic head stacked thereon is formed, but only the inductive type thin film magnetic head may be formed.

Moreover, in the above embodiment, although the ion milling as an anisotropic etching to recede the forefront of the top pole from the air bearing surface, another ion beam etching, reactive ion etching or plasma etching may be employed.

According to the thin film magnetic head of the present invention as mentioned above, since the forefront of the top pole is receded from the air bearing surface by the anisotropic etching with the insulating layer surrounding the pole chip as an etching stopper, without changing the size and shape of the minute pole chip, the forefront of the top pole can be receded backward precisely. The track width is determined by the width of the pole chip. Then, since the magnetic pole portion of the top pole as well as the pole chip can be formed precisely according to the present invention, the pole chip can be formed precisely so as to have a width of submicron order or quarter micron order.

Moreover, since the forefront of the top pole can be receded from the air bearing surface by a desired distance, the undesired side write can be prevented effectively, so that the effective track width can be prevented from being widened and the writing in the adjacent track can be prevented. Since the pole chip can be contacted to the top pole so as to have a sufficient contacting area thereto, the magnetic flux does not saturate at the contacting area, so that the writing characteristics can be improved. In this case, by widening the backward of the pole chip gradually or making it wider than the width of the magnetic pole portion, the contacting area between the pole chip and the top pole can be more large.

Furthermore, in the embodiment in which the forefront of the magnetic pole portion of the top pole is receded from the air bearing surface and its height is made higher backward from the air bearing surface, the problem can be ironed out that the overcoat layer made of alumina is peeled off in the polishing process to form the air bearing surface.

Moreover, in the embodiment in which the bottom pole chip and the top pole chip are formed and the first layer-thin film coil is positioned in the bottom pole chip thickness, since the standard position of throat height=0 is determined by the boundary position between the bottom pole chip and the thin film coil, the top pole chip can be extended backward beyond the standard position of throat height=0. Thus, the standard position of throat height=0 is determined precisely and the pole chip can be magnetically connected to the top pole chip in good condition.

In the case of forming the insulating layer to support the first layer-thin film coil in insulated separation of an inorganic insulating material such as a silicon oxide material or a silicon nitride material, the insulation-withstand voltages between the first layer-thin film coil and the shield gap layer, between the first layer-thin film coil and the second layer-thin film coil and between the second layer-thin film coil and the top pole can be enhanced, and the leakage from the thin film coil can be reduced.

In such an embodiment, since the first and the second thin film coil can be formed on a flat surface having little alignment errors of photo-lithography, the interval of the continuous winding body constituting the thin film coil can be narrowed, so that the magnetic circuit can be short, resulting in the enhancement of the high frequency characteristics of the writing inductive type tin film magnetic head.

What is claimed is:

1. A thin film magnetic head comprising:
    a first magnetic layer constituting one pole of an inductive type thin film magnetic head,
    a write gap layer formed on a surface of the first magnetic layer,
    a pole chip extending alongside the opposite surface of the write gap layer to the first magnetic layer, its forefront being positioned so as to be exposed to an air bearing surface,
    an insulating layer formed on the surface on which the pole chip is provided so as to have the same flat surface level as that of the pole chip,
    a thin film coil formed, in insulated separation, on the opposite surface of the insulating layer to the first magnetic layer,
    a second magnetic layer extending alongside the opposite surfaces of the pole chip and the thin film coil from the first magnetic layer to constitute the other pole of the inductive type thin film magnetic head, having its forefront receded backward from the air bearing surface and magnetically connected to the first magnetic layer at a location spaced from the air bearing surface,
    an overcoat layer extending from the air bearing surface so as to cover the pole chip and the second magnetic layer, and
    a substrate to support the first magnetic layer, the write gap layer, the pole chip, the insulating layer, the thin film coil, the second magnetic layer and the overcoat layer,
    the forefront of the second magnetic layer being receded from the air bearing surface by anisotropic etching with the insulating layer as an etching stopper.

2. A thin film magnetic head as defined in claim 1, further comprising, between the substrate and the first magnetic layer,
    a third magnetic layer extending backward from its forefront constituting the air bearing surface to constitute one shield for a magneto-resistive effective type thin film magnetic head,
    a shield gap layer extending alongside the opposite surface of the third magnetic layer to the substrate, and
    a magnetoresistive element arranged in the shield gap layer, in electrically and magnetically insulated separation, so that its forefront may expose to the air bearing surface,
    the first magnetic layer constituting the other shield for the magnetoresistive effective type thin film magnetic head, the magnetoresistive effective type thin film magnetic head for reading and the inductive type thin film magnetic head being stacked each other so as to be supported by the substrate to constitute a composite type thin film magnetic head.

3. A thin film magnetic head as defined in claim 1, wherein the forefront of the second magnetic layer is made inclined so that the part of the forefront may be receded more distantly from the air bearing surface as the part leaves the pole chip.

4. A thin film magnetic head as defined in claim 3, wherein the angle of gradient of the forefront of the second magnetic layer is 30–60° in the measurement from the parallel surface to the air bearing surface.

5. A thin film magnetic head as defined in claim 1, wherein a trim structure is formed in the neighboring side of the first magnetic layer to the air bearing surface and the pole chip is extended to the back end of the trim structure.

6. A thin film magnetic head as defined in claim 1, further comprising a second pole chip between the first magnetic layer and the write gap layer and a second insulating layer, on the flat surface on which the second pole chip is provided, to support, in insulated separation, a first layer-thin film coil of a two layered thin film coil constituting the thin film coil.

7. A thin film magnetic head as defined in claim 6, wherein the second pole chip is extended to a position of throat height=0 from the air bearing surface and the first pole chip is extended backward beyond the position of throat height=0 from the air bearing surface.

8. A thin film magnetic head as defined in claim 7, wherein the width of the backward extending part of the first pole chip beyond the position of throat height=0 is wider than that of the part of the first pole chip between the position of throat height=0 and the air bearing surface.

9. A thin film magnetic head as defined in claim 8, wherein the width of the backward extending part of the first pole chip beyond the position of throat height=0 become wider gradually toward the backward.

10. A method for manufacturing a thin film magnetic head comprising the steps of:

forming a bottom pole extending backward from an end of an air bearing surface so as to be supported by a substrate, forming a write gap layer so as to cover at least the magnetic pole portion of the bottom pole, forming a pole chip on the write gap layer, forming an insulating layer on the bottom pole so as to have the same level flat surface as that of the pole chip, forming a thin film coil on a surface of the insulating surface with insulation-separated by an insulating material, forming a magnetic film constituting a top pole on the surfaces of the pole chip and the thin film coil and thereafter, forming the forefront of the magnetic film receded backward from the air bearing surface by anisotropic etching with the insulating layer as an etching stopper, forming an overcoat layer so as to cover the top pole, and polish-forming the air bearing surface.

11. A method for manufacturing a thin film magnetic head as defined in claim 10, further comprising the steps of:

forming, on the substrate, a bottom shield extending backward from the end constituting the air bearing surface, and forming, on a surface of the bottom shield, a magnetoresistive element insulation-separated by a shied gap layer, the bottom pole being formed on a surface of the shield gap layer so as to constitute a top pole of a reading magnetoresistive effective type thin film magnetic head, whereby a composite type thin film magnetic head, having the magnetoresistive effective type thin film magnetic head and an inductive type thin film magnetic head which are stacked each other and supported by the substrate, is produced.

12. A method for manufacturing a thin film magnetic film as defined in claim 11, further comprising the steps of:

forming, on a surface of the bottom pole, a bottom pole chip extending from the air bearing surface after forming the bottom pole doubling as a top shield on a surface of the shield gap layer, forming a first insulating layer so as to have the same level flat surface as the bottom pole chip, forming the write gap film on the flat surfaces of the bottom pole chip and the first insulating layer, forming, on the write gap layer, a top pole chip, thereafter, forming a first layer-thin film coil so as to be embedded in a second insulating layer, forming, on the flat surfaces of the top pole chip and the second insulating layer, a second layer-thin film coil so as to be supported by a third insulating layer, forming a top pole on the third insulating layer, and thereafter, receding the forefront of the top pole from the air bearing surface by anisotropic etching with the second insulating layer as a etching stopper.

13. A method for manufacturing a thin film magnetic film as defined in claim 12, wherein the top pole chip is formed so as to extend backward beyond the bottom pole chip.

14. A method for manufacturing a thin film magnetic film as defined in claim 10, wherein the anisotropic etching to form the forefront of the top pole is ion beam etching.

15. A method for manufacturing a thin film magnetic film as defined in claim 14, wherein the ion beam etching to form the forefront of the top pole is carried out at an angle of 30–60° from the perpendicular surface to the surface of the pole chip and thereby, the forefront of the top pole is formed in slope so that the part of the forefront may be receded more distantly from the air bearing surface as the part leaves the pole chip.

* * * * *